(12) United States Patent
Lee et al.

(10) Patent No.: US 12,298,806 B2
(45) Date of Patent: May 13, 2025

(54) FOLDABLE ELECTRONIC DEVICE INCLUDING DISPLAY

(71) Applicant: SAMSUNG ELECTRONICS CO., LTD., Suwon-si (KR)

(72) Inventors: Yongseok Lee, Suwon-si (KR); Taewon Park, Suwon-si (KR); Chankeun Song, Suwon-si (KR); Jongkyun Im, Suwon-si (KR); Minsu Jung, Suwon-si (KR); Youngjae Hue, Suwon-si (KR); Byounguk Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/530,093

(22) Filed: Dec. 5, 2023

(65) Prior Publication Data

US 2024/0111331 A1 Apr. 4, 2024

Related U.S. Application Data

(63) Continuation of application No. 17/821,710, filed on Aug. 23, 2022, now Pat. No. 11,846,986, which is a
(Continued)

(30) Foreign Application Priority Data

Dec. 23, 2019 (KR) .......................... 10-2019-0173225

(51) Int. Cl.
*G06F 1/16* (2006.01)
(52) U.S. Cl.
CPC .......... *G06F 1/1616* (2013.01); *G06F 1/1652* (2013.01); *G06F 1/1681* (2013.01)

(58) Field of Classification Search
CPC combination set(s) only.
See application file for complete search history.

(56) References Cited

U.S. PATENT DOCUMENTS 8,804,349 B2 8/2014 Lee et al.
9,348,450 B1 * 5/2016 Kim .................... H04M 1/0268
(Continued)

FOREIGN PATENT DOCUMENTS

CN 103034293 B 7/2018
CN 109841152 A 6/2019
(Continued)

OTHER PUBLICATIONS

Notice of Patent Grant issued Aug. 6, 2024, in connection with Korean Patent Application No. KR 10-2019-0173225, 5 pages.
(Continued)

*Primary Examiner* — Lisa Lea-Edmonds

(57) ABSTRACT

An electronic device including a foldable housing including a first housing, a second housing, and a connection structure; a flexible display; a first plate including at least a portion disposed on a lower end of a first area of the display and a first periphery; a second plate including at least a portion disposed on a lower end of a second area of the display, and a second periphery; and a protection layer. When the electronic device is in an unfolded state, the first periphery and the second periphery are configured to be in contact with the display. When the electronic device pivots from the unfolded state to a folded state, the first periphery and the second periphery are configured to be spaced apart from the display, and the protection layer is configured to cover an area of the display exposed between the first periphery and the second periphery.

21 Claims, 18 Drawing Sheets

Related U.S. Application Data continuation of application No. 17/133,319, filed on Dec. 23, 2020, now Pat. No. 11,435,779.

(56) References Cited

U.S. PATENT DOCUMENTS

| | | | |
|---|---|---|---|
| 10,575,415 B2* | 2/2020 | Shin | H04N 5/64 |
| 10,775,852 B2 | 9/2020 | Kim et al. | |
| 10,932,376 B2 | 2/2021 | Park et al. | |
| 10,963,012 B2 | 3/2021 | Shin | |
| 11,016,537 B2 | 5/2021 | Lee et al. | |
| 11,314,284 B2* | 4/2022 | Kim | H10K 50/84 |
| 11,406,026 B2 | 8/2022 | Van Dijk et al. | |
| 11,435,779 B2* | 9/2022 | Lee | G06F 1/1656 |
| 11,455,017 B2* | 9/2022 | Liu | G06F 1/1626 |
| 11,516,323 B2* | 11/2022 | Jung | H04M 1/0216 |
| 11,609,612 B2 | 3/2023 | Park et al. | |
| 11,846,986 B2* | 12/2023 | Lee | G06F 1/1656 |
| 2014/0111954 A1 | 4/2014 | Lee et al. | |
| 2017/0264723 A1 | 9/2017 | Mok et al. | |
| 2018/0324964 A1* | 11/2018 | Yoo | H05K 5/03 |
| 2019/0012028 A1 | 1/2019 | Park | |
| 2019/0196543 A1 | 6/2019 | Mizoguchi et al. | |
| 2019/0369668 A1* | 12/2019 | Kim | G06F 1/1652 |
| 2020/0183450 A1* | 6/2020 | Jang | H04M 1/0216 |
| 2020/0192435 A1* | 6/2020 | Park | G06F 1/1652 |
| 2020/0221587 A1 | 7/2020 | An | |
| 2020/0293094 A1* | 9/2020 | Liu | F16M 11/04 |
| 2020/0352038 A1* | 11/2020 | Kim | G06F 1/1647 |
| 2021/0105894 A1* | 4/2021 | Oh | H05K 1/0281 |
| 2021/0141420 A1 | 5/2021 | Kim et al. | |
| 2021/0191460 A1* | 6/2021 | Lee | H04M 1/0268 |
| 2021/0211530 A1* | 7/2021 | Jung | G06F 1/1681 |
| 2021/0255672 A1 | 8/2021 | Kim et al. | |
| 2021/0397223 A1 | 12/2021 | Lee et al. | |
| 2022/0300042 A1* | 9/2022 | Heo | G06F 1/1656 |
| 2022/0404868 A1* | 12/2022 | Lee | H04M 1/0268 |
| 2023/0104660 A1* | 4/2023 | Jung | G06F 1/1616 |
| | | | 361/679.27 |
| 2023/0354524 A1* | 11/2023 | Kim | H05K 1/0281 |
| 2024/0111331 A1* | 4/2024 | Lee | G06F 1/1616 |
| 2024/0369098 A1* | 11/2024 | Bae | F16C 11/04 |

FOREIGN PATENT DOCUMENTS

| | | | |
|---|---|---|---|
| KR | 200236190 Y1 | 9/2001 | |
| KR | 20160001622 A | 1/2016 | |
| KR | 10-2016-0083608 A | 7/2016 | |
| KR | 10-1923294 B1 | 11/2018 | |
| KR | 10-2019-0007788 A | 1/2019 | |
| KR | 10-2019-0020303 A | 2/2019 | |
| KR | 20190114863 A | 10/2019 | |
| KR | 20190137433 A | 12/2019 | |
| WO | 2019109858 A1 | 6/2019 | |

OTHER PUBLICATIONS

Office Action issued Mar. 14, 2024, in connection with Chinese Patent Application No. CN202080089327.4, 15 pages.

Supplementary European Search Report dated Dec. 19, 2022 in connection with European Patent Application No. 20 90 5357, 7 pages.

Office Action dated Feb. 10, 2023 in connection with India Patent Application No. 202217042016, 6 pages.

International Search Report and Written Opinion of the International Searching Authority in connection with International Application No. PCT/KR2020/019022 issued Apr. 15, 2021, 7 pages.

* cited by examiner

FOLDABLE ELECTRONIC DEVICE INCLUDING DISPLAY

CROSS-REFERENCE TO RELATED APPLICATIONS

This application is a continuation of application Ser. No. 17/821,710 filed Aug. 23, 2022, now U.S. Pat. No. 11,846,986 issued Dec. 19, 2023, which is a continuation of application Ser. No. 17/133,319, now U.S. Pat. No. 11,435,779 which issued Sep. 6, 2022, which is based on and claims priority under 35 U.S.C. § 119 to Korean Patent Application No. 10-2019-0173225, filed Dec. 23, 2019 in the Korean Intellectual Property Office, the disclosures of which are herein incorporated by reference in their entirety.

BACKGROUND

1. Field

Various embodiments of the disclosure relate to a foldable electronic device including a display.

2. Description of Related Art

With the enhancement of digital technology, electronic devices are provided in various forms like smartphones, tablet personal computers (PCs), or personal digital assistants (PDAs), or the like. Electronic devices are developing into portable or wearable electronic devices to enhance portability and accessibility of users.

Recently, portable electronic devices such as smartphones, tablet PCs, or the like become lighter, thinner to be easy to carry, and are developing in various fields for the sake of use convenience. In particular, a foldable electronic device provided with a flexible display can provide a relatively large screen compared to a normal bar type electronic device, and can have its size reduced by being folded and is easy to carry. Therefore, the foldable electronic devices are on the spotlight as electronic devices for satisfying consumer preferences.

The above information is presented as background information only to assist with an understanding of the disclosure. No determination has been made, and no assertion is made, as to whether any of the above might be applicable as prior art with regard to the disclosure.

SUMMARY

A foldable electronic device may include a flexible display and a support plate to support a back surface of the flexible display.

The support plate may be attached only to some areas of the flexible display, and, when the foldable electronic device pivots from an unfolded state to a folded state, some areas of the support plate may be spaced apart from the flexible display, such that an operation trace of the flexible display is not hindered.

Due to the above-described structure, a space may be formed between the flexible display and the support plate when the foldable electronic device pivots from the unfolded state to the folded state. Accordingly, during the folding process of the foldable electronic device, foreign substances (for example, dusts) may flow into the space formed between the flexible display and the support plate. The foreign substances flowing into the space formed between the flexible display and the support plate may come into close contact with a certain area of the flexible display, and the foreign substances stuck on the flexible display may cause a defect of the flexible display.

Accordingly, various embodiments of the disclosure are to prevent external foreign substances from flowing into a space formed between a flexible display and a support plate when a foldable electronic device is folded.

According to an embodiment, an electronic device includes: a foldable housing including a first housing, a second housing, and a connection structure configured to connect the first housing and the second housing to enable the second housing to pivot about the first housing; a flexible display which is disposed from one area of the first housing to at least one area of the second housing across the connection structure, and is foldable according to the pivoting; a first plate which has at least a portion disposed on a lower end of a first area of the flexible display corresponding to the first housing, and has a first periphery extended along a center axis of the pivoting; a second plate which has at least a portion disposed on a lower end of a second area of the flexible display corresponding to the second housing, and has a second periphery extended along the center axis of the pivoting and adjacent to the first periphery of the first plate; and a protection layer which is in contact with the first plate and the second plate on at least some areas, and is disposed between the first plate and the second plate, and the connection structure, wherein, when the electronic device is in an unfolded state, the first periphery of the first plate and the second periphery of the second plate are in contact with the flexible display, wherein, when the electronic device pivots from the unfolded state to a folded state, the first periphery of the first plate and the second periphery of the second plate are spaced apart from the flexible display, and the protection layer is disposed to cover an area of the flexible display that is exposed between the first periphery of the first plate and the second periphery of the second plate.

According to an embodiment, an electronic device includes: a foldable housing including a first housing, a second housing, and a connection structure configured to connect the first housing and the second housing to enable the second housing to pivot about the first housing; a flexible display which is disposed from one area of the first housing to at least one area of the second housing across the connection structure, and is foldable according to the pivoting; a first plate which has at least a portion disposed under a first area of the flexible display corresponding to the first housing, and has a first periphery extended along a center axis of the pivoting; a second plate which has at least a portion disposed under a second area of the flexible display corresponding to the second housing, and has a second periphery extended along the center axis of the pivoting and adjacent to the first periphery of the first plate; and a protection layer which is in contact with the first plate and the second plate on at least some areas, and is disposed between the first plate and the second plate, and the connection structure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
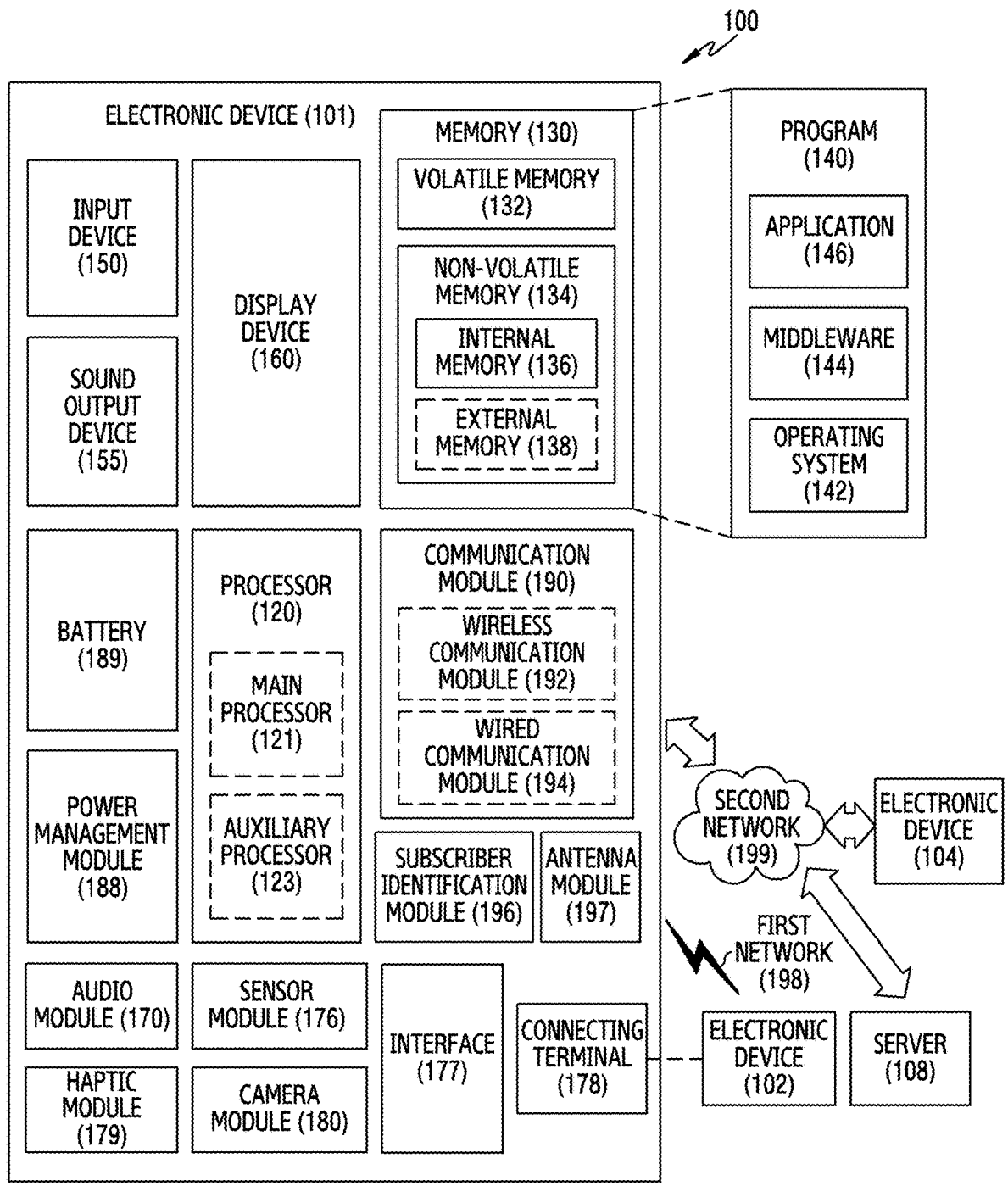
FIG. 1 illustrates a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
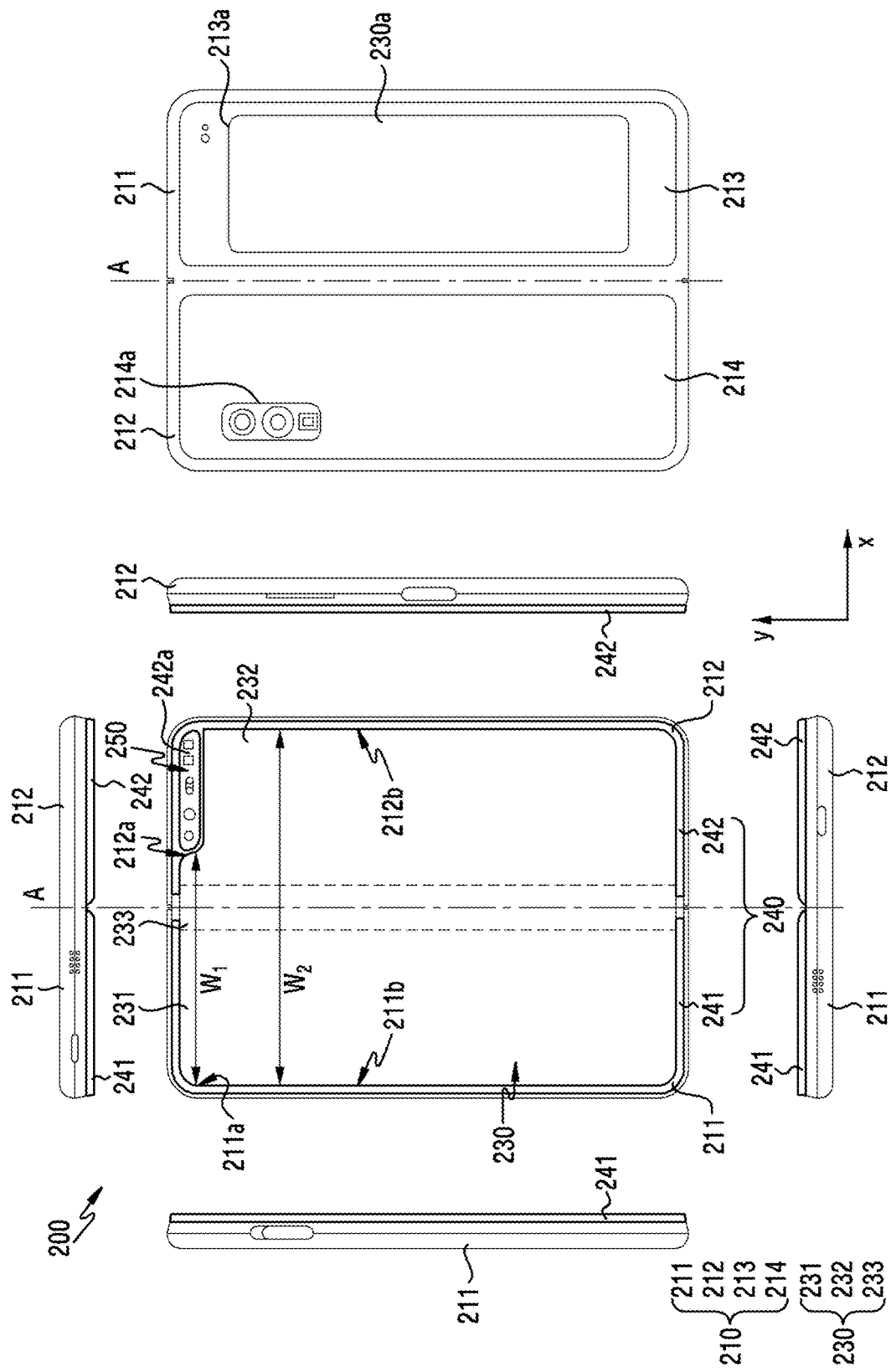
FIG. 2 is a view illustrating an unfolded state of an electronic device according to an embodiment.
Figure 3:
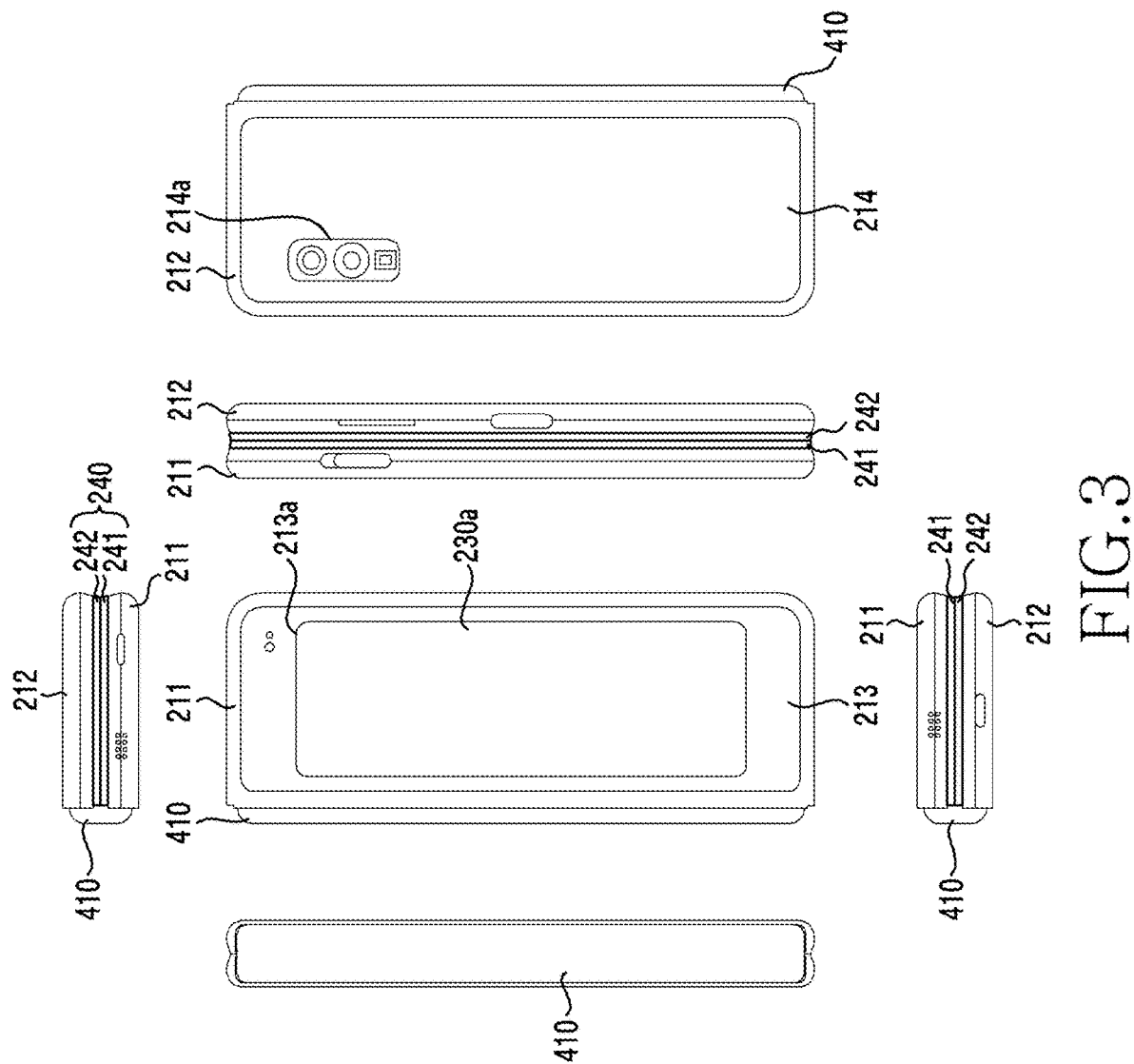
FIG. 3 is a view illustrating a folded state of the electronic device according to various embodiments.

FIG. 2 is a view illustrating an unfolded state of an electronic device 200 according to an embodiment, and FIG. 3 is a view illustrating a folded state of the electronic device 200 according to an embodiment.

Referring to FIGS. 2 and 3, the electronic device 200 (for example, the electronic device 101 of FIG. 1) according to an embodiment may include a foldable housing 210, a hinge housing 410 to cover a foldable portion of the foldable housing 210, a flexible or foldable display 230 (hereinafter, referred to as a "display" 230) disposed in a space formed by the foldable housing 210, and a protection member 240 disposed on the display 230.

In the disclosure, a surface on which the display 230 is disposed is defined as a first surface or a front surface of the electronic device 200. In addition, the opposite surface of the above-mentioned front surface is defined as a second surface or a rear surface of the electronic device 200, and a surface surrounding a space between the front surface and the rear surface is defined as a third surface or a side surface of the electronic device 200.

The foldable housing 210 according to an embodiment may include a first housing 211, a second housing 212 including a sensor area 250, a first rear cover 213, and a second rear cover 214. The foldable housing 210 of the electronic device 200 according to various embodiments is not limited to the shape and/or coupling illustrated in FIGS. 2 and 3, and may be implemented by a combination and/or coupling of other shapes or components. For example, the first housing 211 and the first rear cover 213 may be integrally formed with each other, and the second housing 212 and the second rear cover 214 may be integrally formed with each other.

According to an embodiment (for example, FIGS. 2, 3), the first housing 211 and the second housing 212 may be disposed on both sides with reference to a folding axis (A axis), and may have a substantially symmetrical shape with reference to the folding axis (A axis). The first housing 211 and the second housing 212 may have their angle or distance changed according to whether the electronic device 200 is in an unfolded state (or flat state), a folded state, or an intermediate state, and a detailed description thereof will be provided below.

The second housing 212 according to an embodiment may further include the sensor area 250 having various sensors disposed thereon, which is different from the first housing 211, and the first housing 211 and the second housing 212 may be formed symmetrically to each other on an area other than the above-described sensor area 250.

As shown in FIG. 2, the first housing 211 and the second housing 212 according to an embodiment may form a recess to receive the display 230. The recess may have two different widths in a direction perpendicular to the folding axis (A axis) due to the sensor area 250, which is disposed on a certain area of the second housing 212.

For example, the recess may have a first width w1 between a first portion 211a of the first housing 211 parallel to the folding axis (A axis), and a first portion 212a of the second housing 212 formed on an edge of the sensor area 250. In another example, the recess may have a second width w2 formed by a second portion 211b of the first housing 211 parallel to the folding axis (A axis), and a second portion 212b of the second housing 212 that does not correspond to the sensor area 250 and is parallel to the folding axis (A axis). In this case, the second width w2 may be longer than the first width w1. In other words, the first portion 211a of the first housing 211 and the first portion 212a of the second housing 212 which are asymmetrical to each other may form the first width w1 of the recess, and the second portion 211b of the first housing 211 and the second portion 212b of the second housing 212 which are symmetrical to each other may form the second width w2 of the recess. The first portion 212a and the second portion 212b of the second housing 212 described above may have different distances from the folding axis (A axis). However, the widths of the recess are not limited to the embodiment illustrated in FIG. 2. For example, the recess may include a plurality of widths according to a shape of the sensor area 250 disposed in the second housing 212 or areas of the first housing 211 and the second housing 212 that have an asymmetrical shape.

According to an embodiment, at least a portion of the first housing 211 and the second housing 212 may be formed with a metallic material or a nonmetallic material having stiffness of a designated degree to support the display 230.

According to an embodiment, the sensor area 250 may be formed to have a predetermined area adjacent to one corner (for example, an upper end corner) of the second housing 212. However, the arrangement, shape, and/or size of the sensor area 250 are not limited to the embodiment illustrated in FIG. 2. For example, the sensor area 250 may be disposed on another corner (for example, a lower end corner) of the second housing 212, or on a certain area between the upper end corner and the lower end corner. Components embedded in the electronic device 200 to perform various functions may be exposed to the front surface of the electronic device 200 through the sensor area 250 or one or more openings provided on the sensor area 250. According to an embodiment, the above-described components may include various types of sensors, and the sensors may include, for example, at least one of a front-facing camera, a receiver, or a proximity sensor, but are not limited hereto.

According to an embodiment, the first rear cover 213 may be disposed on one side of the folding axis (A axis) (for example, the right side of the folding axis (A axis)) of the rear surface of the electronic device 200. The first rear cover 213 may have a substantially rectangular periphery, for example, and the periphery may be surrounded by the first housing 211. Similarly, the second rear cover 214 according to an embodiment may be disposed on the other side (for example, the left side of the folding axis (A axis)) of the folding axis (A axis) of the rear surface of the electronic device 200, and may have its periphery surrounded by the second housing 212.

Referring to FIGS. 2 and 3, the first rear cover 213 and the second rear cover 214 may have a substantially symmetrical shape with reference to the folding axis (A axis). However, the first rear cover 213 and the second rear cover 214 may not necessarily have the symmetrical shape, and the electronic device 200 according to an embodiment may include the first rear cover 213 and the second rear cover 214 of various shapes. According to another embodiment, the first rear cover 213 may be integrally formed with the first housing 211, and the second rear cover 214 may be integrally formed with the second housing 212.

According to an embodiment, the first rear cover 213, the second rear cover 214, the first housing 211, and the second housing 212 may form a space to have various components (for example, a printed circuit board or a battery) of the electronic device 200 disposed therein. According to an embodiment, at least one component may be disposed on the rear surface of the electronic device 200 or may be visually exposed. For example, at least a portion of a sub display 230a may be visually exposed through a first rear surface area 213a of the first rear cover 213. In another embodiment, one or more components or sensors may be visually exposed through a second rear surface area 214a of the second rear cover 214. In this case, the sensor may include, for example, a proximity sensor and/or a rear facing camera, but is not limited thereto.

Referring to FIG. 3, the hinge housing 410 may include a curved surface, and may be disposed between the first housing 211 and the second housing 212 and may be configured to hide a component (for example, a hinge structure) disposed inside the electronic device 200. The hinge housing 410 according to an embodiment may be hidden by a portion of the first housing 211 and the second housing 212 or may be exposed to the outside of the electronic device 200 according to a state of the electronic device 200 (for example, an unfolded state or a folded state).

In an example (for example, see FIG. 2), when the electronic device 200 is in the unfolded state, the hinge housing 410 may be hidden and may not be exposed by the first housing 211 and the second housing 212.

In another example (for example, see FIG. 3), when the electronic device 200 is in the folded state (for example, a fully folded state), the hinge housing 410 described above may be exposed to the outside between the first housing 211 and the second housing 212.

In still another example, when the first housing 211 and the second housing 212 are in an intermediate state in which the first housing 211 and the second housing 212 are folded with a certain angle, the hinge housing 410 may be partially exposed to the outside between the first housing 211 and the second housing 212. However, an area of the hinge housing 410 that is exposed to the outside of the electronic device 200 when the electronic device 200 is in the intermediate state may be smaller than the area when the electronic device 200 is in the fully folded state.

The display 230 according to an embodiment may be disposed on the space formed by the foldable housing 210. For example, the display 230 may be seated on the recess formed by the foldable housing 210 to configure most of the front surface of the electronic device 200. The display 230 may refer to a display that has at least some areas deformed to a flat surface or a curved surface.

The display 230 according to an embodiment may include a folding area 233, a first area 231 disposed on one side (for example, the left side of the folding area 233 shown in FIG. 2) with reference to the folding area 233, and a second area 232 disposed on the other side (for example, the right side of the folding area 233 shown in FIG. 2) with reference to the folding area 233. However, the division of the areas of the display 230 illustrated in FIG. 2 is merely an example, and the display 230 may be divided into a plurality of areas (for example, two or four or more areas) according to a structure or a function of the display 230. According to an embodiment (for example, see FIG. 2), the area of the display 230 may be divided by the folding area 233 or the folding axis (A axis) extended in parallel to the y axis, but the area of the display 230 according to another embodiment may be divided with reference to another folding area (for example, a folding area parallel to the x axis) or another folding axis (for example, a folding axis parallel to the x axis).

The first area 231 and the second area 232 described above may have a substantially symmetrical shape with reference to the folding area 233. However, unlike the first area 231, the second area 232 may include a notch area cut according to the presence of the sensor area 250, but the second area 232 may have a symmetrical shape to the first area 231 on an area other than the notch area. That is, the first area 231 and the second area 232 may include portions symmetrical to each other and portions asymmetrical to each other.

The protection member 240 according to an embodiment may be attached to at least a certain area of the foldable housing 210 to protect the display 230 from an external shock. The protection member 240 may be formed along the periphery of the display 230, and may prevent the first area 231 and the second area 232 of the display 230 from being brought into contact with each other when the electronic device 200 is in the folded state.

According to an embodiment, the protection member 240 may include a first protection member 241 formed along some areas of the upper end periphery, a left periphery, and some areas of the lower end periphery of the display 230, and a second protection member 242 formed along some areas of the upper end periphery, a right periphery, and some areas of the lower end periphery of the display 230. According to an embodiment, the first protection member 241 and the second protection member 242 may be formed in a band-like structure of a substantially "J-" shape, but is not limited thereto. In addition, although FIG. 2 illustrates that the protection member 240 includes the first protection member 241 and the second protection member 242, this should not be considered as limiting, and according to an embodiment, the protection member 240 may include a plurality of protection members (for example, 4 or 6 protection members).

The first protection member 241 and the second protection member 242 may be disposed on positions spaced apart from each other by a designated distance as shown in FIG. 2. An overall length of the display 230 when the electronic device 200 is in the folded state may be shorter than that of the display 230 when the electronic device 200 is in the unfolded state, due to the folding area 233. However, the first protection member 241 and the second protection member 242 may be disposed on positions spaced apart from each other by the designated distance, such that one end of the first protection member 241 and one end of the second protection member 242 facing the above-described first protection member 241 can be prevented from overlapping each other when the electronic device 200 is in the folded state.

The first protection member 241 and the second protection member 242 according to an embodiment may have a substantially symmetrical shape with reference to the folding area 233. However, the second protection member 242 may include an exposure area 242a to expose the sensor area 250 to the outside of the electronic device 200, and the first protection member 241 and the second protection member 242 may have an asymmetrical shape due to the exposure area 242a. The above-described second protection member 242 may have a symmetrical shape with the first protection member 241 on an area other than the exposure area 242a. That is, the first protection member 241 and the second protection member 242 may include portions symmetrical to each other, and portions asymmetrical to each other.

According to an embodiment, the first protection member 241 may be integrally formed with the first housing 211, and similarly, the second protection member 242 may be integrally formed with the second housing 212. However, the arrangement and/or coupling structure of the first protection member 241 and the second protection member 242 is not limited thereto, and the first protection member 241 and the second protection member 242 according to an embodiment may not be coupled to some areas of the first housing 211 and/or the second housing 212 and may be attached to the display 230.

According to the above-described configuration, the front surface of the electronic device 200 may include the display 230, the protection member 240 disposed on the display 230 and formed along the periphery of the display 230, and some areas of the first housing 211 and some areas of the second housing 212 which are adjacent to the display 230. In addition, the rear surface of the electronic device 200 may include the first rear cover 213, some areas of the first housing 211 that are adjacent to the first rear cover 213, the second rear cover 214, and some areas of the second housing 212 that are adjacent to the second rear cover 214.

Hereinafter, operations of the first housing 211 and the second housing 212 according to a state of the electronic device 200 (for example, an unfolded state and a folded state), and respective area of the display 230 will be described.

According to an embodiment (for example, see FIG. 2), when the electronic device 200 is in the unfolded state, the first housing 211 and the second housing 212 may form the angle of 180°, and may be disposed to face in the same direction. The surface of the first area 231 of the display 230 and the surface of the second area 232 may form the angle of 180° and may face in the same direction (for example, a front facing direction of the electronic device). The folding area 233 may be coplanar with the first area 231 and the second area 232. For example, the first protection member 241 may be disposed on an area corresponding to the first area 231 of the display 230, and the second protection member 242 may be disposed on an area corresponding to the second area 232 of the display 230. That is, when the electronic device 200 is in the unfolded state, the first protection member 241 and the second protection member 242 may face in the same direction.

According to another embodiment (for example, see FIG. 3), when the electronic device 200 is in the folded state, the first housing 211 and the second housing 212 may be disposed to face each other. The surface of the first area 231 of the display 230 and the surface of the second area 232 may face each other while forming a small angle (for example, an angle between 0 and 10 degrees) with each other. At least a portion of the folding area 233 may be formed with a curved surface having a predetermined curvature. A surface of the first protection member 241 disposed on an area corresponding to the first area 231 of the display 230, and a surface of the second protection member 242 disposed on an area corresponding to the second area 232 may be brought into contact with each other. In an example, the first area 231 and the second area 232 of the display 230 may not be in direct contact with each other due to the first protection member 241 and the second protection member 242. If the first area 231 and the second area 232 are in direct contact with each other, a friction may be generated between the first area 231 and the second area 232 of the display 230 by an external shock (for example, falling). The friction generated between the first area 231 and the second area 232 may damage the surface of the first area 231 and/or the second area 232. On the other hand, the electronic device 200 according to an embodiment may prevent the first area 231 and the second area 232 from being brought into contact with each other through the first protection member 241 and the second protection member 242, and as a result, when the electronic device 200 is in the folded state, some areas of the display 230 can be prevented from being damaged by an external shock.

According to another embodiment, when the electronic device 200 is in the intermediate state, the first housing 211 and the second housing 212 may be disposed with a certain angle. In the above-described case, the first protection member 241 and the second protection member 242 may be disposed to form a certain angle. The surface of the first area 231 of the display 230 and the surface of the second area 232 may form an angle larger than in the folded state and smaller than in the unfolded state. At least a portion of the folding area 233 may be formed with a curved surface having a predetermined curvature, and in this case, the curvature may be smaller than in the folded state.

Although it is illustrated in the above-described embodiments that the electronic device 200 is folded in the vertical direction with reference to the vertical direction (for example, the y direction of FIG. 3), embodiments of the disclosure are not limited to the above-described embodiments. The electronic device 200 according to another embodiment may be folded in the horizontal direction with reference to a virtual folding axis extended in the horizontal direction (for example, the x direction of FIGS. 2, 3).

Figure 4:
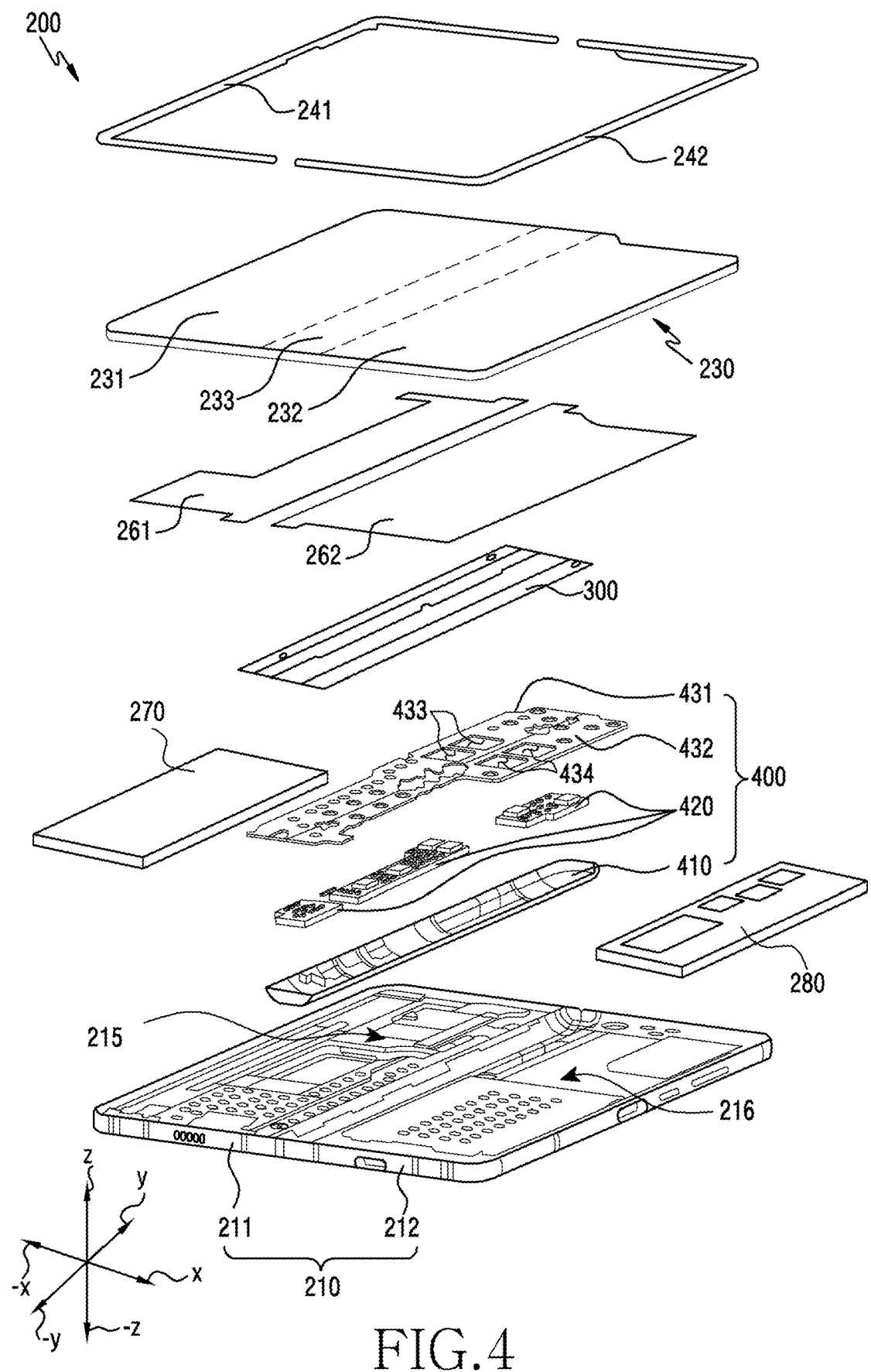
FIG. 4 illustrates an exploded perspective view of an electronic device according to an embodiment.

FIG. 4 illustrates an exploded perspective view of an electronic device 200 according to an embodiment.

Referring to FIG. 4, the electronic device 200 (for example, the electronic device 200 of FIGS. 2, 3) according to an embodiment may include a first protection member 241 (for example, the first protection member 241 of FIG. 2), a second protection member 242 (for example, the second protection member 242 of FIG. 2), a display 230 (for example, the display 230 of FIG. 2), a first support plate 261, a second support plate 262, a protection layer 300 (for example, a "protection sheet"), a first bracket 215, a second bracket 216, a foldable housing 210 (for example, the foldable housing 210 of FIGS. 2, 3), and/or a connection structure 400. At least one of the components of the electronic device 200 of FIG. 4 may be the same as or similar to at least one of the components of the electronic device of FIGS. 2 and/or 3, and a redundant explanation will be omitted.

According to an embodiment, the first protection member 241 and the second protection member 242 may be attached to at least a certain area of the foldable housing 210 to protect at least some areas of an upper end surface (for example, a surface in the z direction of FIG. 4) of the display 230 from an external shock. According to another embodiment, the first protection member 241 and the second protection member 242 may be integrally formed with a first housing 211, a second housing 212 of the foldable housing 210, respectively. In an example, the first protection member 241 may be disposed along a left periphery (for example, the −x direction of FIG. 4) of the display 230 with reference to the center of the display 230, and the second protection member may be disposed along a right periphery (for example, the x direction of FIG. 4) of the display 230.

According to an embodiment, the display 230 may include a plurality of layers. The display 230 may include, for example, a protection film layer, a polarization layer, a thin film encapsulation layer, a pixel layer, a thin film transistor (TFT) layer, and/or a cushion layer. The display 230 may emit light from the pixel layer to deliver information to a user, and the light emitted from the pixel layer may be transmitted to the outside of the electronic device 200. The display 230 may include a folding area 233, a first area 231 positioned on the left (for example, the −x direction of FIG. 4) with reference to the folding area 233, and a second area 232 positioned on the right (for example, the x direction of FIG. 4) with reference to the folding area 233. The first area 231, the folding area 233, and the second area 232 described above may be disposed to face in the same direction when the electronic device 200 is in an unfolded state. In contrast, when the electronic device 200 is in a folded state, at least some areas of the folding area 233 of the display 230 may be bent, and accordingly, the first area 231 and the second area 232 may be disposed to face each other.

According to an embodiment, the first support plate 261 and the second support plate 262 may be attached to at least some areas of a lower end surface (for example, a surface in the −z direction of FIG. 4) of the display 230 to support a certain area of the display 230. In an example, the first support plate 261 may be attached to the first area 231 of the display 230 to support at least a certain area of the display 230. Similarly, the second support plate 262 may be attached to the second area 232 of the display 230 to support at least a certain area of the display 230.

In an example, some areas of the first support plate 261 may be attached to the first area 231 of the display 230, and the other area may not be attached to the first area 231 of the display 230. In addition, some areas of the second support plate 262 may be attached to the second area 232 of the display 230, and the other area may not be attached to the second area 232 of the display 230. Through the above-descried structure, a certain area of the first support plate 261 and some areas of the second support area 262 may be spaced apart from the display 230 when the electronic device 200 pivots from the unfolded state (for example, see FIG. 2) to the folded state (for example, see FIG. 3). Accordingly, when the electronic device 200 pivots from the unfolded state (for example, see FIG. 2) to the folded state (for example, see FIG. 3), some areas (for example, the folding area 233) of the display 230 may be exposed between the first support plate 261 and the second support plate 262. This will be described in detail below.

According to an embodiment, the first support plate 261 and the second support plate 262 may be formed with a material having designated rigidity to support at least a certain area of the display 230. For example, the first support plate 261 and the second support plate 262 may be formed with a metallic material (for example, stainless steel (SUS)). However, this should not be considered as limiting, and according to another embodiment, the first support plate 261 and the second support plate 262 may be formed with polymer.

According to an embodiment, the protection layer 300 may be disposed between the first support plate 261, the second support plate 262 and the connection structure 400. As described above, when the electronic device 200 pivots from the unfolded state to the folded state, some areas of the first support plate 261 and the second support plate 262 are spaced apart from the display 230, such that a predetermined space is formed between the first support plate 261 and the second support plate 262. The protection layer 300 according to an embodiment can prevent foreign substances (for example, dusts) from flowing into the predetermined space when the electronic device 200 pivots from the unfolded state to the folded state. Accordingly, the protection layer 300 can prevent a defect of the display 230 from being caused by foreign substances, which will be described in detail below.

According to an embodiment, the first bracket 215 and the second bracket 216 may be disposed within the foldable housing 210 to support components (for example, an electronic component) of the electronic device 200. In an example, the first bracket 215 may be disposed within the first housing 211, and the second bracket 216 may be disposed within the second housing 212. The first bracket 215 and the second bracket 216 described above are disposed within the first housing 211 and the second housing 212, respectively, to provide a space to have electronic components (for example, a wire member, a printed circuit board) for implementing various functions of the electronic device 200 mounted thereon. In addition, the first bracket 215 and the second bracket 216 may support some areas of the display 230 that are not supported by the first support plate 261 and/or the second support plate 262.

According to an embodiment, the foldable housing 210 may include the first housing 211, the second housing 212, a first rear cover (for example, the first rear cover 213 of FIG. 2), a second rear cover (for example, the second rear cover 214 of FIG. 2). In an example, the foldable housing 210 may form a side surface and/or a rear surface of the electronic device 200. The above-described foldable housing 210 may have a space formed therein to have components (for example, a battery 270, a printed circuit board 280) of the electronic device 200 disposed therein. In an example, the first rear cover may be attached to at least a certain area of the first housing 211, and the second rear cover may be attached to at least a certain area of the second housing 212. In another example, the first housing 211 and the first rear cover may be integrally formed with each other, and the second housing 212 and the second rear cover may be integrally formed with each other.

According to an embodiment, the battery 270 is a device for supplying power at least one component of the electronic device 200, and may be disposed in the space formed inside the above-described foldable housing 210. The battery 270 may include a primary battery which is not rechargeable, a rechargeable secondary battery, or a fuel cell, but is not limited thereto.

According to an embodiment, the printed circuit board 280 may be disposed in the space formed inside the foldable housing 210, and components for implementing various functions of the electronic device 200 may be mounted on the printed circuit board 280. For example, a processor (for example, the processor 120 of FIG. 1), a communication module (for example, the communication module 190 of FIG. 1), a memory (for example, the memory 130 of FIG. 1), etc. may be disposed on the printed circuit board 280.

According to an embodiment, the connection structure 400 may be disposed between the first housing 211 and the second housing 212. The connection structure 400 may pivotably connect the first housing 211 and the second housing 212, and the first housing 211 and the second housing 212 may pivot within a designated rotation angle range through the connection structure 400.

According to an embodiment, the connection structure 400 may be a hinge assembly. The hinge assembly may include, for example, a hinge housing 410 (for example, the hinge housing 410 of FIG. 3), at least one hinge module 420, a first hinge plate 431, and a second hinge plate 432.

In an example, the hinge housing 410 may be fixed to at least a certain area of the foldable housing 210 through a fixing member (for example, a screw). The hinge housing 410 may be disposed between the first housing 211 and the second housing 212 to hide the hinge module 420 disposed inside the hinge housing 410 or to protect from an external shock. The hinge housing 410 according to an embodiment may be hidden by a portion of the first housing 211 and the second housing 212, or may be exposed to the outside of the electronic device 200 according to a state of the electronic device 200 (for example, the unfolded state or folded state). In an example (for example, see FIG. 2), when the electronic device 200 is in the unfolded state, the hinge housing 410 may be hidden by the first housing 211 and the second housing 212 and may not be exposed. In another example (for example, see FIG. 3), when the electronic device 200 is in the folded state (for example, a fully folded state), the hinge housing 410 may be exposed to the outside between the first housing 211 and the second housing 212.

In an example, the at least one hinge module 420 may pivotably connect the first housing 211 and the second housing 212. The first housing 211 and the second housing 212 may pivot within a designated rotation angle range through the at least one hinge module 420, and as a result, the electronic device may pivot from the folded state to the unfolded state or in reverse may pivot from the unfolded state to the folded state. The at least one hinge module 420 may include, for example, a first hinge module which allows the display 230 to be bent, folded along a designated rotation trace during the pivoting process of the electronic device 200, a second hinge module for assisting pivotal movement of the first housing 211 and the second housing 212, and a third hinge module for fixing movement of the first housing 211 and the second housing 212 within a designated rotation angle (for example, 180°) and/or a designated rotation angle range (for example, 30° to 60°). However, the disclosure is not limited to the above-described embodiment, and the at least one hinge module 420 according to another embodiment may further include other hinge modules in addition to the first hinge module, the second hinge module, and the third hinge module.

In an example, the first hinge plate 431 and the second hinge plate 432 may be disposed on the hinge housing 410 to face the display 230 and to form one surface (for example, a surface in the z direction of FIG. 4) of the hinge assembly. The at least one hinge module 420 may be disposed in a space formed by the first hinge plate 431, the second hinge plate 432, and the hinge housing 410. An opening 433, 434 may be formed on at least a certain area of the first hinge plate 431 and the second hinge plate 432, and the at least one hinge module 420 disposed in the space formed by the first hinge plate 431, the second hinge plate 432, and the hinge housing 410 may be electrically connected with the printed circuit board and/or the battery disposed in the foldable housing 210 through the above-described opening 433, 434. In an example, an electric connection means (for example, a flexible printed circuit board (FPCB)) electrically connected with the at least one hinge module 420 may penetrate through the opening 433, 434 formed on the first hinge plate 431, the second hinge plate 432, and may be electrically connected with the printed circuit board and/or the battery disposed inside the foldable housing 210.

The connection structure 400 according to another embodiment may be an articulated structure. In an example, the articulated structure may include a plurality of joints arranged continuously, and the first housing 211 and the second housing 212 may be pivotably connected with each other through the above-described at least one joint. In an example, inclined surfaces may be formed on at least a certain area of the plurality of joints, and the first housing 211 and the second housing 212 may rotate within a designated rotation angle range with the inclined surfaces of the plurality of joints being in close contact with one another. However, the embodiment where the connection structure 400 is the articulated structure will be described in detail below.

Figure 5:
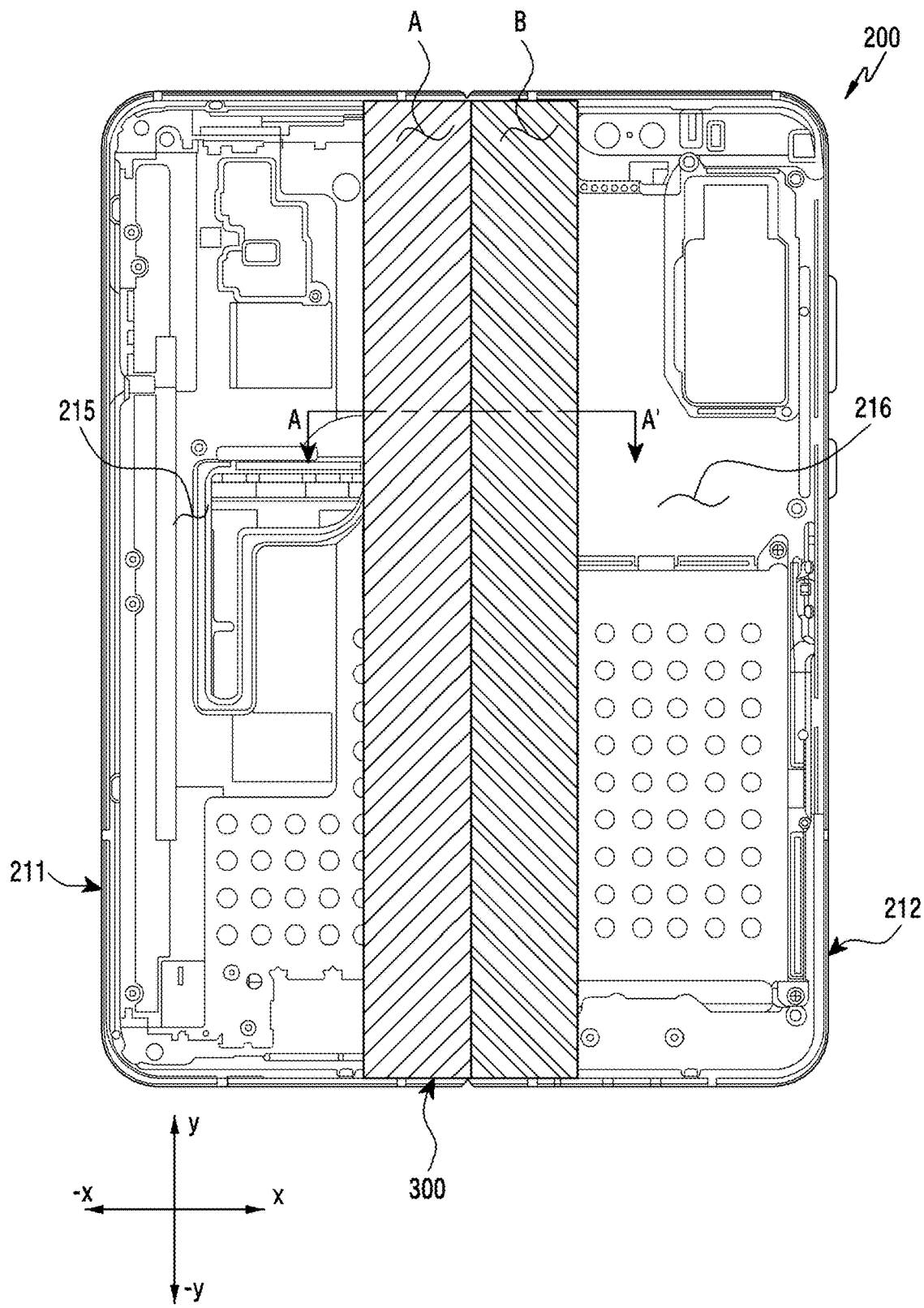
FIG. 5 is a top view illustrating some components of an electronic device when the electronic device is in an unfolded state according to an embodiment.
Figure 6:
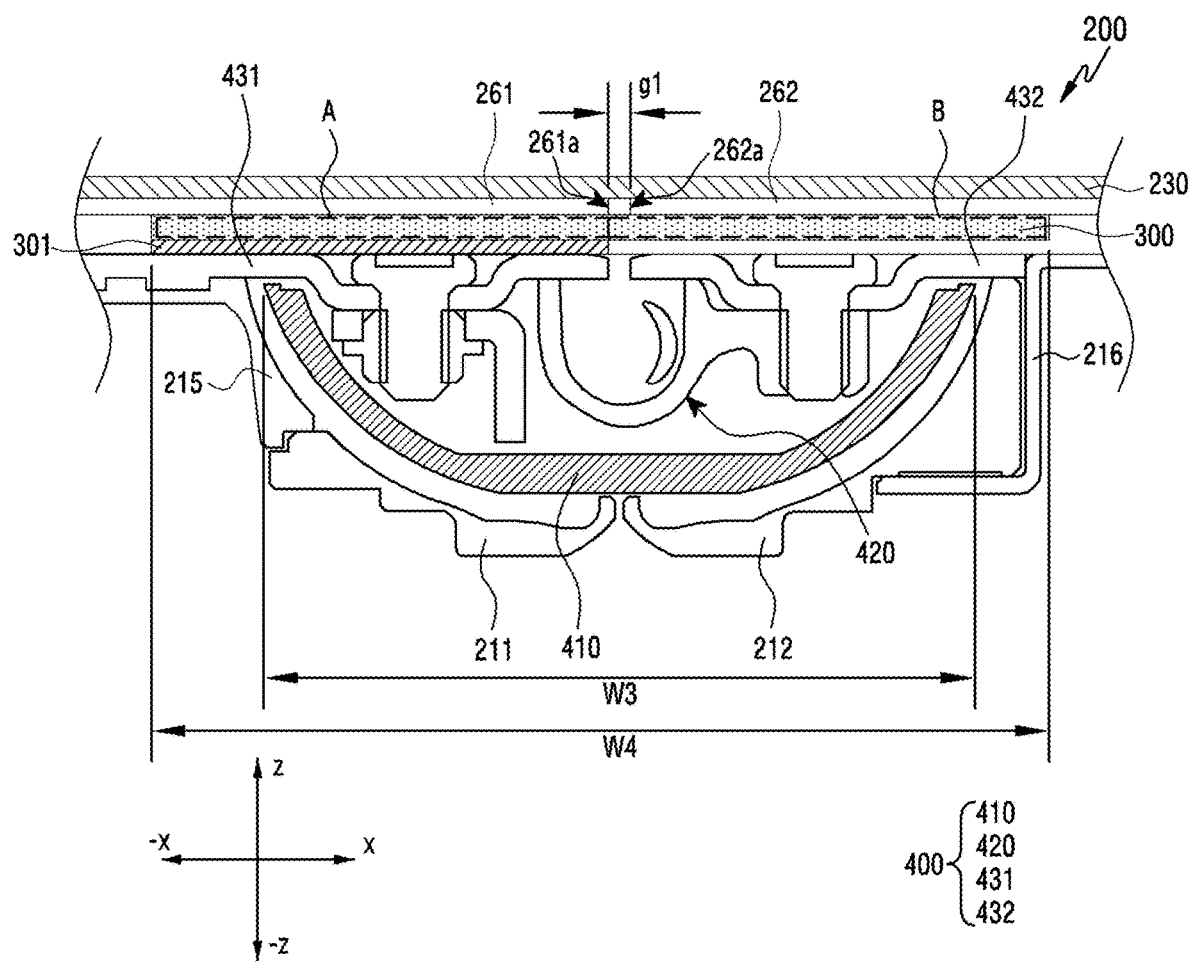
FIG. 6 illustrates a cross-sectional view of the electronic device of FIG. 5, taken on line A-A'.

FIG. 5 is a top view illustrating some components of an electronic device when the electronic device 200 is in an unfolded state according to an embodiment, and FIG. 6 illustrates a cross-sectional view of the electronic device 200 of FIG. 5, taken on line A-A'. FIG. 5 of the disclosure is a view from which some components (for example, the display 230, the first support plate 261, the second support plate 262) of the electronic device 200 are omitted.

Referring to FIGS. 5 and 6, the electronic device 200 according to an embodiment may include a display 230 (for example, the display 230 of FIG. 4), a first support plate 261 (for example, the first support plate 261 of FIG. 4), a second support plate 262 (for example, the second support plate 262 of FIG. 4), a first housing 211 (for example, the first housing 211 of FIG. 4), a second housing 212 (for example, the second housing 212 of FIG. 4), a connection structure 400 (for example, the connection structure 400 of FIG. 4), a protection layer 300 (for example, the protection layer 300 of FIG. 4). At least one of the components of the electronic device 200 of FIGS. 5, 6 may be the same as or similar to at least one of the components of the electronic device of FIG. 4, and a redundant explanation will be omitted.

The first support plate 261 and the second support plate 262 according to an embodiment may be attached to at least a certain area of a lower end surface (for example, a surface in the −z direction of FIG. 6) of the display 230 to support at least a certain area of the display 230. The first support plate 261 may be attached to a certain area (for example, an area in the −x direction of FIG. 6) of the display 230, and the second support plate 262 may be attached to the other area (for example, an area in the x direction of FIG. 6) of the display 230. In an example, the first support plate 261 may include a first periphery 261a extended in a longitudinal direction (for example, the y direction of FIG. 5). The second support plate 262 may include a second periphery 262a facing the first periphery 261a and extended in the longitudinal direction (for example, the y direction of FIG. 5). When the electronic device 200 is in an unfolded state (for example, see FIG. 6), the first periphery 261a of the first support plate 261 and the second periphery 262a of the second support plate 262 may be disposed to be spaced part from each other by a first width (for example, g1 of FIG. 6). The first periphery 261a and the second periphery 262a are disposed to be spaced part from each other by the first width g1, such that the first support plate 261 and the second support plate 262 does not hinder an operation trace of the display 230 in the pivoting process of the electronic device 200.

According to an embodiment, the first housing 211 and the second housing 212 may be pivotably coupled with each other by the connection structure 400. Through the above-described structure, the first housing 211 and the second housing 212 may rotate within a designated rotation angle range according to a user's operation, and accordingly, the electronic device 200 may pivot from the unfolded state (for example, see FIG. 6) to the folded state or may pivot from the folded state to the unfolded state. A first bracket 215 may be disposed inside the first housing 211, and a second bracket 216 may be disposed inside the second housing 212. In an example, the first bracket 215 and the second bracket 216 may indirectly support at least a certain area of the display 230 by supporting the first support plate 261 and the second support plate 262 attached to the lower end surface (for example, a surface in the −z direction of FIG. 6) of the display 230. In another example, the first bracket 215 and the second bracket 216 may directly support the display 230.

The connection structure 400 according to an embodiment may be a hinge assembly including a hinge housing 410 (for example, the hinge housing 410 of FIG. 4), a hinge module 420 (for example, the hinge module 420 of FIG. 4), a first hinge plate 431 (for example, the first hinge plate 431 of FIG. 4), and a second hinge plate 432 (for example, the second hinge plate 432 of FIG. 2). However, the configuration of the hinge assembly is not limited to the above-described embodiment, and the hinge assembly according to an embodiment may omit one of the above-described components (for example, the first hinge plate 431 and/or the second hinge plate 432).

In an example, the hinge housing 410 may be fixed between the first housing 211 and the second housing 212, and the hinge module 420 may be disposed within the hinge housing 410. The above-described hinge housing 410 can protect the hinge module 420 disposed therein from an external shock.

In an example, the hinge module 420 may pivotably connect the first housing 211 and the second housing 212. The first housing 211 and the second housing 212 may pivot within a designated rotation range through the hinge module 420, and through this, the electronic device 200 may pivot from the folded state to the unfolded state, or in reverse, may pivot from the unfolded state to the folded state.

In an example, the first hinge plate 431 and the second hinge plate 432 may be positioned on an upper end (for example, the z direction of FIG. 6) of the hinge housing 410 to form one surface (for example, an upper end surface) of the hinge assembly. The first hinge plate 431 may be positioned on an upper end of the left side (for example, the −x direction of FIG. 6) of the hinge housing 410, and second hinge plate 432 may be positioned on an upper end of the right side (for example, the x direction of FIG. 6) of the hinge housing 410. The first hinge plate 431 and the second hinge plate 432 described above may pivot along with the first housing 211 and the second housing 212. In an example, when the electronic device 200 is in the unfolded state (for example, see FIG. 6), the first hinge plate 431 and the second hinge plate 432 may be disposed to face in the same direction. In another example, when the electronic device 200 pivots from the unfolded state to the folded state, the first hinge plate 431 and the second hinge plate 432 may pivot all together. Accordingly, the first hinge plate 431 and the second hinge plate 432 may be disposed to face each other, which will be described in detail below.

In an example, the first hinge plate 431 may indirectly support some areas (for example, an area corresponding to the first area 231 of FIG. 4) of the display 230, by supporting a first area (for example, an A area of FIGS. 5, 6) of the protection layer 300 and/or some areas of the first support plate 261. Similarly, the second hinge plate 432 may indirectly support some areas (for example, an area corresponding to the second area 232 of FIG. 4) of the display 230, by supporting a second area (for example, a B area of FIGS. 5, 6) of the protection layer 300 and/or some areas of the second support plate 262. In another example, the first hinge plate 431 and the second hinge plate 432 may be brought into direct contact with some areas of the display 230, thereby supporting some areas of the display 230.

According to an embodiment, the protection layer 300 may be positioned between the first support plate 261 and/or the second support plate 262, and the connection structure 400 disposed between the first housing 211 and the second housing 212. According to an embodiment, the first area (for example, the A area of FIGS. 5, 6) of the protection layer 300 may be fixed between the first support plate 261, and the first bracket 215 in the first housing 211 and/or the first hinge plate 431.

In an example, the first area (A area) (or a "fixing area") of the protection layer 300 may be attached onto a certain area of the first hinge plate 431 through an adhesive member 301, and may be fixed between the first support plate 261 and the first hinge plate 431. In another example, the first area (A area) of the protection layer 300 may be attached onto a certain area of the first bracket 215 through the adhesive member 301, and may be fixed between the first support plate 261 and the first bracket 215. In still another example, the first area (A area) of the protection layer 300 may be attached onto a certain area of the first hinge plate 431 and a certain area of the first bracket 215, and may be fixed between the first support plate 261, and the first bracket 215 and the first hinge plate 431. The above-described adhesive member 301 may be, for example, an adhesive, an adhesive tape, but is not limited thereto.

That is, the first area (A area) of the protection layer 300 in the electronic device 200 according to an embodiment may be attached onto and fixed to one surface of the connection structure 400 and/or one surface of the first bracket 215 in the first housing 211.

According to an embodiment, the second area (for example, the B area of FIGS. 5, 6) of the protection layer 300 may not be fixed to components (for example, the second bracket 216, the second support plate 262) of the electronic device 200, and may freely slide as the electronic device 200 pivots. That is, the protection layer 300 may be positioned between the first support plate 261 and/or the second support plate 262, and the connection structure 400 disposed between the first housing 211 and the second housing 212, thereby preventing foreign substances from flowing between the display 230 and the first support plate 261 and/or the second support plate 262. In addition, the second area (for example, the B area of FIGS. 5, 6) of the protection layer 300 described above freely slides, such that a folding operation of the display 230 caused by a pivotal movement of the electronic device 200 cannot be hindered. A process in which some areas (for example, the second area B) of the protection layer 300 slide will be described in detail below.

Since some areas of the protection layer 300 slide when the electronic device 200 pivots from the unfolded state to the folded state or pivots from the folded state to the unfolded state as described above, the protection layer 300 according to an embodiment may be formed with a material having designated stiffness and less friction. For example, the protection layer 300 may be formed with polyethylene terephthalate (PET) having less friction and stiffness, but is not limited thereto. Foreign substances may flow into the hinge housing 410 through a gap formed between the first housing 211 and the hinge housing 410 and/or a gap formed between the second housing 212 and the hinge housing 410. Accordingly, the protection layer 300 according to an embodiment may be formed to have a width larger than the hinge housing 410 of the connection structure 400, and can prevent foreign substances, drawn into the hinge housing 410, from flowing toward the display 230. In an example, the protection layer 300 may be formed to have a fourth width W4 larger than a third width W3 of the hinge housing 410, and can prevent foreign substances, drawn into the hinge housing 410, from flowing toward the display 230.

Figure 7:
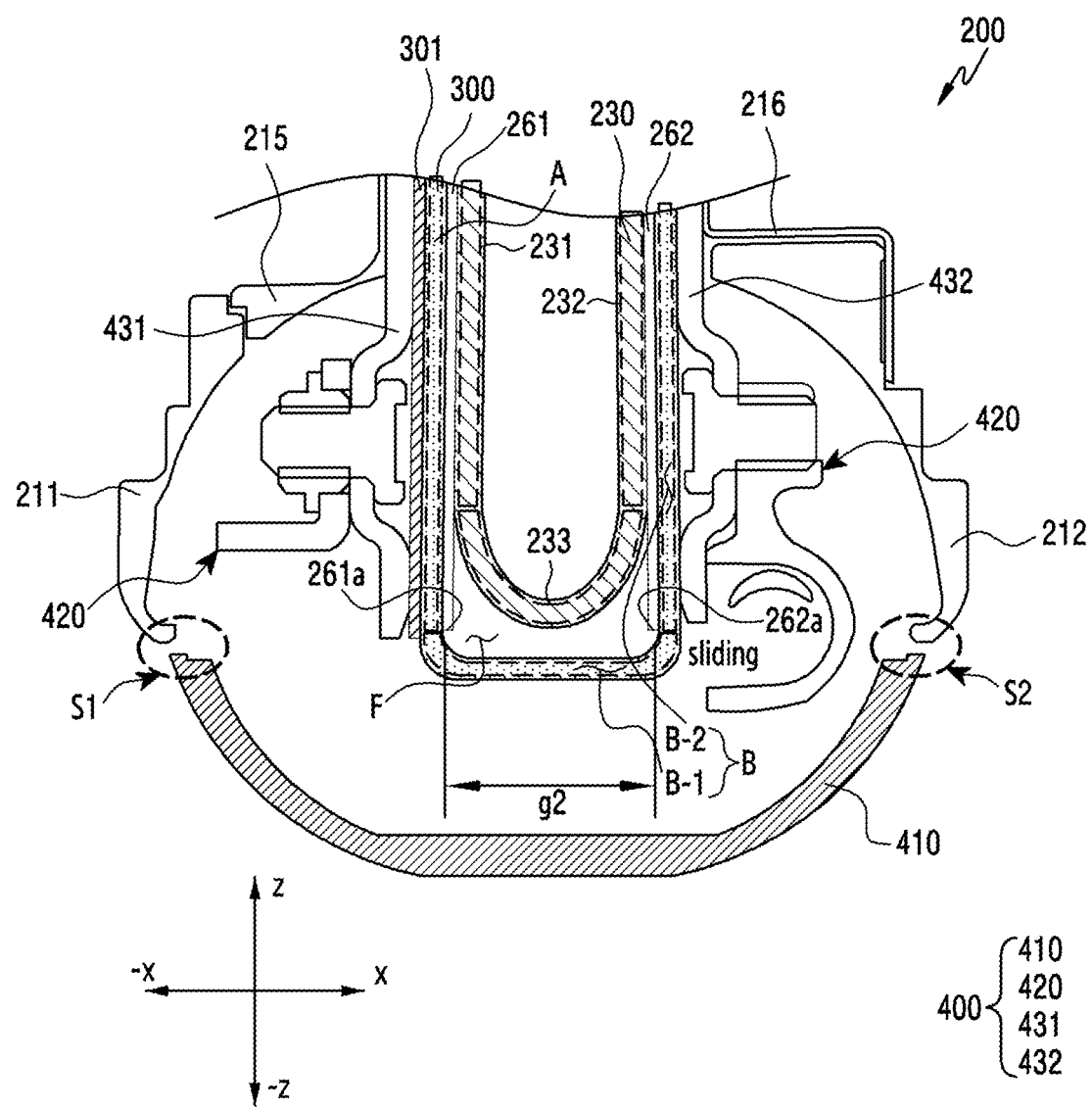
FIG. 7 is a view illustrating a cross section of an electronic device when the electronic device is in a folded state according to an embodiment.

FIG. 7 is a view illustrating a cross section of an electronic device when the electronic device 200 is in a folded state according to an embodiment. FIG. 7 of the disclosure is a cross sectional view taken on line A-A' of FIG. 5 when the electronic device 200 is in the folded state, and illustrates a state in which the electronic device of FIGS. 5 and/or 6 (for example, the electronic device 200 of FIGS. 5, 6) pivots.

Referring to FIG. 7, the electronic device 200 according to an embodiment may include a display 230 (for example, the display 230 of FIG. 6), a first support plate 261 (for example, the first support plate 261 of FIG. 6), a second support plate 262 (for example, the second support plate 262 of FIG. 6), a first housing 211 (for example, the first housing 211 of FIG. 6), a second housing 212 (for example, the housing 212 of FIG. 6), a connection structure 400 (for example, the connection structure 400 of FIG. 6), and a protection layer 300 (for example, the protection layer 300 of FIG. 6). At least one of the components of the electronic device 200 of FIG. 7 may be the same as or similar to at least one of the components of the electronic device of FIGS. 5 and/or 6, and a redundant explanation will be omitted.

According to an embodiment, the first housing 211 and the second housing 212 may be pivotably connected with each other through a component (for example, the hinge module 420) of the connection structure 400, and the first housing 211 and the second housing 212 may be disposed to face each other as the electronic device 200 pivots from the unfolded state (for example, see FIG. 6) to the folded state (for example, see FIG. 7).

According to an embodiment, the display 230 may include a folding area 233 (for example, the folding area 233 of FIG. 4), a first area 231 (for example, the first area 231 of FIG. 4) positioned on the left (for example, the −x direction of FIG. 7) with reference to the folding area 233, and a second area 232 (for example, the second area 232 of FIG. 4) positioned on the right (for example, the +x direction of FIG. 7) with reference to the folding area 233. As the electronic device 200 pivots from the unfolded state to the folded state, the display 230 mounted in a recess formed by the first housing 211 and the second housing 212 may be folded, bent. In an example, as the electronic device pivots from the unfolded state to the folded state, the display 230 may be folded with reference to the folding area 233 such that the first area 231 and the second area 232 of the display 230 face each other.

According to an embodiment, the first support plate 261 and the second support plate 262 may be positioned on a lower end (for example, the −y direction of FIG. 7) of the display 230. In an example, the first support plate 261 may include a first periphery 261a extended in a longitudinal direction (for example, the y direction of FIG. 5), and the second support plate 262 may include a second periphery 262a facing the first periphery 261a and extended in the longitudinal direction (for example, the y direction of FIG. 5). In an example, some areas of the first support plate 261 may be attached to the first area 231 of the display 230, and the other area of the first support plate 261 may not be attached to the display 230. Accordingly, the first periphery 261a of the first support plate 261 may be in contact with the first area 231 of the display 230 when the electronic device 200 is in the unfolded state. In contrast, when the electronic device 200 pivots from the unfolded state to the folded state, the first periphery 261a of the first support plate 261 may be detached from the first area 231 of the display 230. Similarly, some areas of the second support plate 262 may be attached to the second area 232 of the display 230, and the other area of the second support plate 262 may not be attached to the display 230. As a result, the second periphery 262a of the second support plate 262 may be in contact with the second area 232 of the display 230 when the electronic device 200 is in the unfolded state. In contrast, when the electronic device 200 pivots from the unfolded state to the folded state, the second periphery 262a of the second support plate 262 may be detached from the second area 232 of the display 230. That is, in the pivoting process of the electronic device 200, the first periphery 261a of the first support plate 261 and the second periphery 262a of the second support plate 262 may repeat the process of coming into contact with a certain area (for example, the first area 231, the second area 232) of the display 230 and being detached from the area of the display 230.

As the electronic device 200 pivots from the unfolded state to the folded state, a distance between the first periphery 261a and the second periphery 262a may increase. In an example, when the electronic device 200 is in the unfolded state, the first periphery 261a and the second periphery 262a may be disposed to be spaced apart from each other by a first width (for example, g1 of FIG. 6). In another example, when the electronic device 200 is in the folded state, the first periphery 261a and the second periphery 262a may be spaced apart from each other by a second width g2 which is larger than the first width.

When the electronic device 200 pivots from the unfolded state to the folded state, the first periphery 261a and the second periphery 262a may be spaced apart from the display 230, such that the folding area 233 of the display 230 is exposed between the first periphery 261a and the second periphery 262a. In this case, a predetermined space (for example, F of FIG. 7) may be formed by the first periphery 261a, the second periphery 262a, and the folding area 233 of the display 230.

Foreign substances (for example, dusts, etc.) may flow into the hinge housing 410 through a gap (for example, S1, S2) formed between the hinge housing 410 of the connection structure 400 and the first housing 211, the second housing 212. If there is no protection layer 300 in the electronic device 200, foreign substances drawn into the hinge housing 410 may flow into the space F formed between the first periphery 261a and the second periphery 262a, and the folding area 233 of the display 230. In addition, in the pivoting process of the electronic device 200, the foreign substances flowing into the above-described space F may flow between the display 230 and the first support plate 261, the second support plate 262, causing a camber defect of the display 230.

The protection layer 300 according to an embodiment can prevent foreign substances, drawn into the hinge housing 410 through the gaps S1, S2 between the hinge housing 410 and the first housing 211 and/or the second housing 212, from flowing into the space F formed between the first periphery 261a and the second periphery 262a, and the folding area 233 of the display 230. According to an embodiment, a first area A (for example, the A area of FIG. 6) of the protection layer 300 may be fixed between the first support plate 261 and the first hinge plate 431 of the connection structure 400 and/or a first bracket 215 disposed within the first housing 211. In an example, the first area A of the protection layer 300 may be attached to some areas of the first hinge plate 431 and/or the first bracket 215 and may be fixed between the first support plate 261 and the first hinge plate 431 and/or the first bracket 215.

A second area B (for example, the second area B of FIG. 6) of the protection layer 300 may not be fixed to components of the electronic device 200, and may slide between the second support plate 262 and the second hinge plate 432 and/or a second bracket 216 of the second housing 212 when the electronic device 200 pivots from the unfolded state to the folded state. As shown in FIG. 7, as the electronic device 200 pivots from the unfolded state to the folded state, the second area B of the protection layer 300 may slide in a direction toward the hinge housing 410 (for example, the −z direction of FIG. 7). A sliding area B-1 of the protection layer 300 formed as the second area B of the protection layer 300 slides may be disposed to cover the folding area 233 of the display 230 exposed between the first periphery 261a of the first support plate 261 and the second periphery 262a of the second support plate 262.

That is, the sliding area B-1 of the protection layer 300 may be disposed to cover the space F formed between the first periphery 261a and the second periphery 262a, and the folding area 233 of the display 230, and may isolate the above-described space F from the hinge housing 410. As a result, the protection layer 300 according to an embodiment can prevent foreign substances, drawn into the hinge housing 410, from flowing into the space F formed between the first periphery 261a and the second periphery 262a, and the folding area 233 of the display 230.

The other area B-2 of the second area B of the protection layer 300 except for the sliding area B-1 may be positioned between the second support plate 262 and the second hinge plate 432 and/or the second bracket 216, and can prevent the protection layer 300 from being released between the first support plate 262 and the second hinge plate 432 or between the second support plate 262 and the second bracket 216.

As described above, since some areas of the protection layer 300 can slide when the electronic device 200 pivots from the unfolded state to the folded state or pivots from the folded state to the unfolded state, the protection layer 300 according to an embodiment may be formed with a material having less friction and stiffness. The protection layer 300 may be formed with PET, for example, and may not be easily crumpled, deformed in the pivoting process of the electronic device 200. However, the material of the protection layer 300 is not limited to the above-described embodiment, and the protection layer 300 according to another embodiment may be formed with other materials having less friction and having designated stiffness.

The protection layer according to another embodiment may be formed with a flexible or stretchable material. In an example, the protection layer may be attached to at least a certain area of the first support plate 261 and/or the second support plate 262, or may be attached to at least a certain area of the first hinge plate 431, the second hinge plate 432, and may be positioned between the first support plate 261, the second support plate 262, and the connection structure 400. The above-described protection layer may be stretched or may contract when the electronic device 200 pivots from the unfolded state to the folded state or pivots from the folded state to the unfolded state. In an example, when the electronic device 200 pivots from the unfolded state to the folded state, the above-described protection layer may be stretched. As the protection layer is stretched when the electronic device pivots from the unfolded state to the folded state as described above, the protection layer can prevent foreign substances from flowing into the space F formed between the first periphery 261a and the second periphery 262a, and the folding area 233 of the display 230. That is, the electronic device 200 according to another embodiment can prevent foreign substances from flowing into the space F formed between the first periphery 261a and the second periphery 262a, and the folding area 233 of the display 230, through the protection layer which is stretched or contracts in the pivoting process of the electronic device 200.

Figure 8:
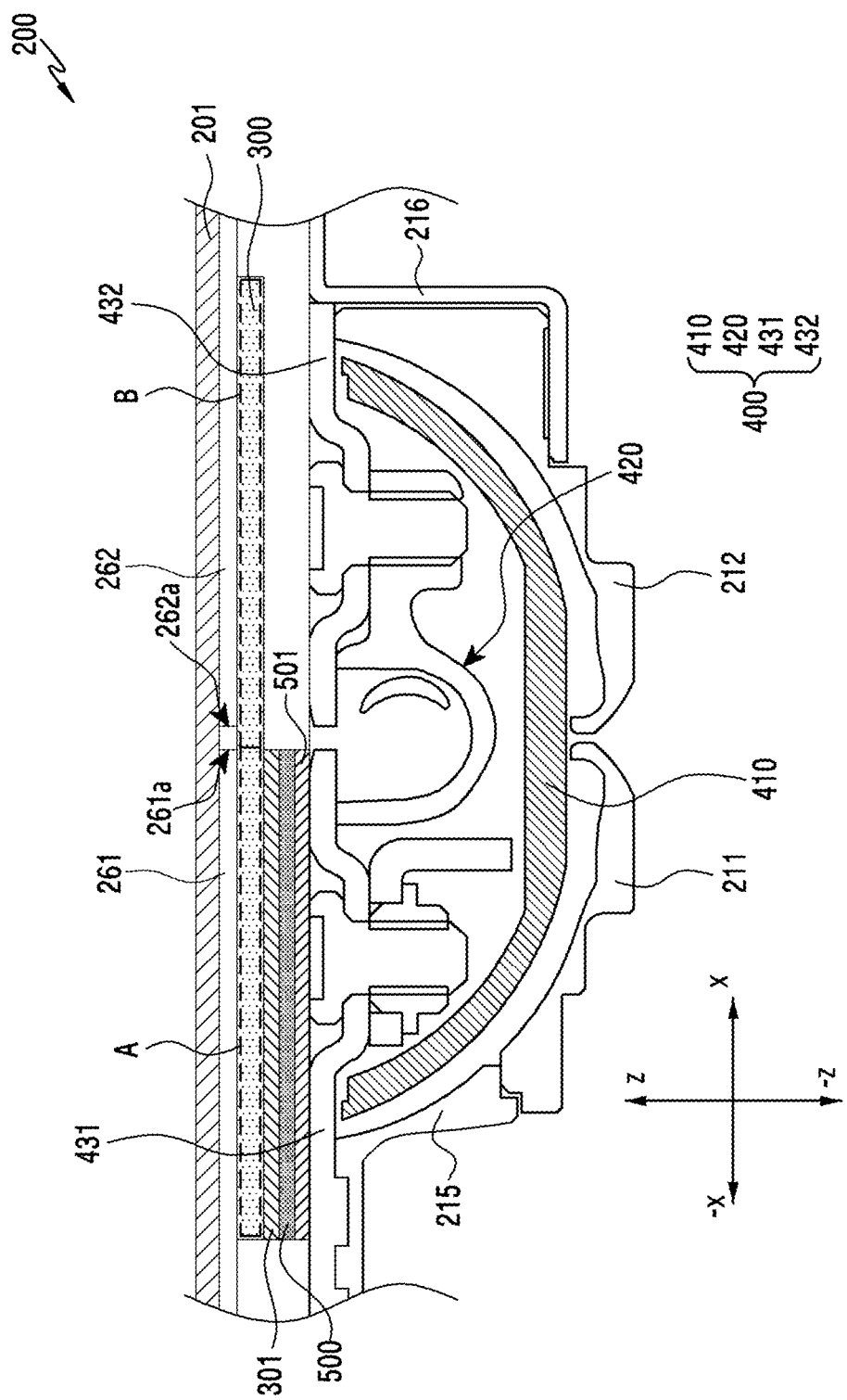
FIG. 8 is a view illustrating a cross section of an electronic device when the electronic device is in an unfolded state according to another embodiment.

FIG. 8 is a cross-sectional view illustrating a protection layer of an electronic device 200 and a plate attached to the protection layer according to an embodiment. At least one of components of the electronic device 200 of FIG. 8 of the disclosure may be the same as or similar to at least one of the components of the electronic device of FIGS. 6 and/or 7, and a redundant explanation will be omitted.

Referring to FIG. 8, the electronic device 200 according to an embodiment may include a display 230 (for example, the display 230 of FIG. 6), a first support plate 261 (for example, the first support plate 261 of FIG. 6), a second support plate 262 (for example, the second support plate 262 of FIG. 6), a first housing 211 (for example, the first housing 211 of FIG. 6), a second housing 212 (for example, the second housing 212 of FIG. 6), a connection structure 400 (for example, the connection structure 400 of FIG. 6), a protection layer 300 (for example, the protection layer 300 of FIG. 6), and a bonding plate 500. That is, the electronic device 200 according to an embodiment may be the electronic device of FIGS. 6 and/or 7 (for example, the electronic device 200 of FIGS. 6, 7) to which the bonding plate 500 is added.

According to an embodiment, the bonding plate 500 may be positioned between some areas (for example, a first area A) of the protection layer 300, and a first hinge plate 431 of the connection structure 400 and/or a first bracket 215 disposed in the first housing 211. In an example, the bonding plate 500 may be attached to one surface of the first hinge plate 431 and/or the first bracket 215 through a first adhesive member 501. One surface (for example, a surface in the z direction of FIG. 8) of the bonding plate 500 that faces the protection layer 300 may have a flat shape, and the protection layer 300 may be attached to the above-described one surface of the bonding plate 500 through a second adhesive member 301 (for example, the adhesive member 301 of FIG. 6). According to an embodiment, the bonding plate 500 may be formed with a material having designated stiffness and a thickness (for example, 0.05 t). For example, the bonding plate 500 may be formed with a metallic material (for example, SUS), but is not limited thereto. In addition, the first adhesive member 501 and/or the second adhesive member 301 may be, for example, an adhesive, an adhesive tape, but is not limited thereto.

That is, some areas (for example, the first area A) of the protection layer 300 in the electronic device 200 according to an embodiment may be fixed to one surface of the first hinge plate 431 and/or the first bracket 215 through the bonding plate 500 attached to the first hinge plate 431 and/or the first bracket 215.

When some areas (for example, the first area A) of the protection layer 300 are directly attached to the first hinge plate 431 and/or the first bracket 215 (for example, see FIG. 6), the protection layer 300 may not be securely attached to the first hinge plate 431 and/or the first bracket 215. For example, components (for example, a wire, a hinge module 420, a screw) of the electronic device 200 may be disposed on one surface of the first hinge plate 431 and/or the first bracket 215, or a step may be formed to have the above-described components disposed thereon. Adhesiveness or a bonding force between the protection layer 300 and the first hinge plate 431 and/or the first bracket 215 may be reduced due to the components disposed on the first hinge plate 431 and/or the first bracket 215 and the step. On the other hand, the protection layer 300 according to an embodiment may be fixed to one surface of the first hinge plate 431 and/or the first bracket 215 through the bonding plate 500 formed in a flat shape, and as a result, the protection layer 300 can be more securely fixed to one surface the first hinge plate 431 and/or the first bracket 215. That is, the electronic device 200 according to an embodiment may have the bonding plate 500 disposed between the protection layer 300 and the first hinge plate 431 and/or the first bracket 215, such that the protection layer 300 can be more securely fixed than when the protection layer 300 is directly attached to one surface of the first hinge plate 431 and/or the first bracket 215.

Figure 9:
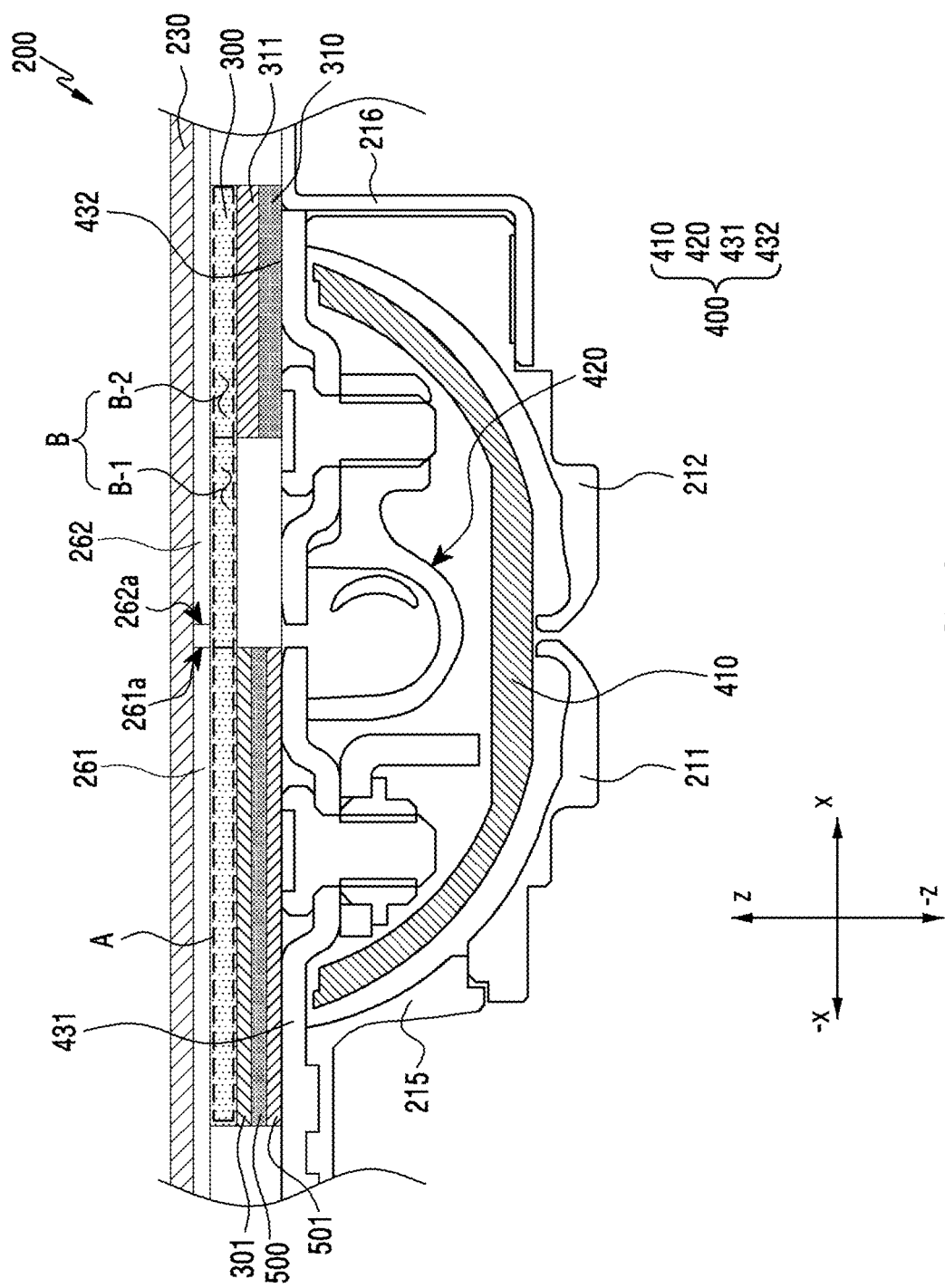
FIG. 9 is a cross-sectional view illustrating a protection layer and a reinforcement plate of an electronic device according to an embodiment.

FIG. 9 is a cross-sectional view illustrating a protection layer 300 and a reinforcement plate 310 of an electronic device 200 according to an embodiment. FIG. 9 of the disclosure illustrates a cross section of the electronic device 200 of FIG. 5 taken on line A-A'.

Referring to FIG. 9, the electronic device 200 according to an embodiment may include a display 230 (for example, the display 230 of FIGS. 6, 8), a first support plate 261 (for example, the first support plate 261 of FIGS. 6, 8), a second support plate 262 (for example, the second support plate 262 of FIGS. 6, 8), a first housing 211 (for example, the first housing 211 of FIGS. 6, 8), a second housing 212 (for example, the second housing 212 of FIGS. 6, 8), a connection structure 400 (for example, the connection structure 400 of FIGS. 6, 8), a protection layer 300 (for example, the protection layer 300 of FIGS. 6, 8), a bonding plate 500 (for example, the bonding plate 500 of FIG. 8), a reinforcement plate 310.

The electronic device 200 according to an embodiment may omit one component (for example, the bonding plate 500) of the above-described components. In addition, at least one of the components of the electronic device 200 according to an embodiment may be the same as or similar to at least one of the components of the electronic device 200 of FIGS. 6, 8, and a redundant explanation will be omitted.

The electronic device 200 according to an embodiment may be the electronic device of FIG. 6 (for example, the electronic device 200 of FIG. 6) or the electronic device of FIG. 8 (for example, the electronic device 200 of FIGS. 7, 8) to which the reinforcement plate 310 is added.

According to an embodiment, a first area (A area) of the protection layer 300 may be attached to one surface (for example, a surface in the z direction of FIG. 9) of the bonding plate 500 through a second adhesive member 301 (for example, the adhesive member 301 of FIG. 6 or the second adhesive member 301 of FIG. 8), thereby being fixed to the bonding plate 500. According to another embodiment, the protection layer 300 may be attached onto a certain area of a first hinge plate 431 and/or a first bracket 215 disposed in the first housing 211 through the second adhesive member 301, thereby being fixed to the first hinge plate 431 and/or the first bracket 215.

A second area (B area) of the protection layer 300 may not be attached to the second support plate 262 and a second hinge plate 432. Through the above-described structure, the second area (B area) of the protection layer 300 may slide between the second support plate 262 and the second hinge plate 432 when the electronic device 200 pivots from the unfolded state to the folded state or pivots from the folded state to the unfolded state. While the second area (B area) of the protection layer 300 is sliding repeatedly, at least a certain area of the second area (B area) of the protection layer 300 may be rolled, crumpled by the second support plate 262 and/or the second hinge plate 432. For example, the second area (B area) of the protection layer 300 may be rolled, crumpled by a step structure formed by the second support plate 262 and/or the second hinge plate 432.

According to an embodiment, the reinforcement plate 310 (or a "stiffener") may be attached to at least a certain area of the second area (B area) of the protection layer 300. In an example, the reinforcement plate 310 may be attached to a lower end surface (for example, a surface in the −z direction of FIG. 9) of the second area (B area) of the protection layer 300 through a third adhesive member 311 (for example, an adhesive, an adhesive tape). In another example, the reinforcement plate 310 may be attached to an upper end surface (for example, a surface in the z direction of FIG. 9) of the second area (B area) of the protection layer 300 through the third adhesive member 311.

According to an embodiment, the reinforcement plate 310 may be formed with material having designated stiffness to reinforce the stiffness of the second area (B area) of the protection layer 300. In an example, the reinforcement plate 310 may be formed with a metallic material (for example, SUS), but is not limited thereto. The electronic device 200 according to an embodiment can prevent the second area (B area) of the protection layer 300 from being crumpled, rolled in the pivoting process of the electronic device 200, by reinforcing the stiffness of the second area (B area) of the protection layer 300 through the reinforcement plate 310.

The electronic device 200 according to another embodiment may not have the reinforcement plate 310 attached to the protection layer 300, and may reinforce the stiffness of the second area (B area) of the protection layer 300 by folding one end (for example, an end in the x direction of FIG. 9) of the second area (B area) of the protection layer 300.

According to an embodiment, the reinforcement plate 310 may have at least one surface formed in a flat shape. In an example, the reinforcement plate 310 may reduce an assembly gap or a tolerance formed between the second support plate 262 and the second area (B area) of the protection layer 300 through the above-described structure. In another example, the reinforcement plate 310 may reduce an assembly gap or a tolerance formed between the second hinge plate 432 and the second area (B area) of the protection layer 300.

When the electronic device 200 pivots from the unfolded state to the folded state, the second area B of the protection layer 300 may slide toward the hinge housing 410 (for example, the −z direction of FIG. 9). As the second area B of the protection layer 300 slides, a sliding area (B-1 area) (for example, the sliding area B-1 of FIG. 7) of the second area B of the protection layer 300 may be disposed to cover some areas (for example, the folding area 233 of FIG. 7) of the display 230 exposed between a first periphery 261*a* of the first support plate 261 and a second periphery 262*a* of the second support plate 262. When the reinforcement plate 310 is attached to all areas of the second area B of the protection layer 300, a reaction may be generated by elasticity of the reinforcement plate 310, and as a result, the second area (B area) of the protection layer 300 may not smoothly slide.

In the electronic device 200 according to an embodiment, the reinforcement plate 310 may be attached to the other area (B-2 area) of the second area B of the protection layer 300 except for the sliding area B-1. Through the above-described structure, the electronic device 200 according to an embodiment can prevent movement reduction of the second area (B area) of the protection layer 300 caused by the attachment of the reinforcement plate 310.

Figure 10A:
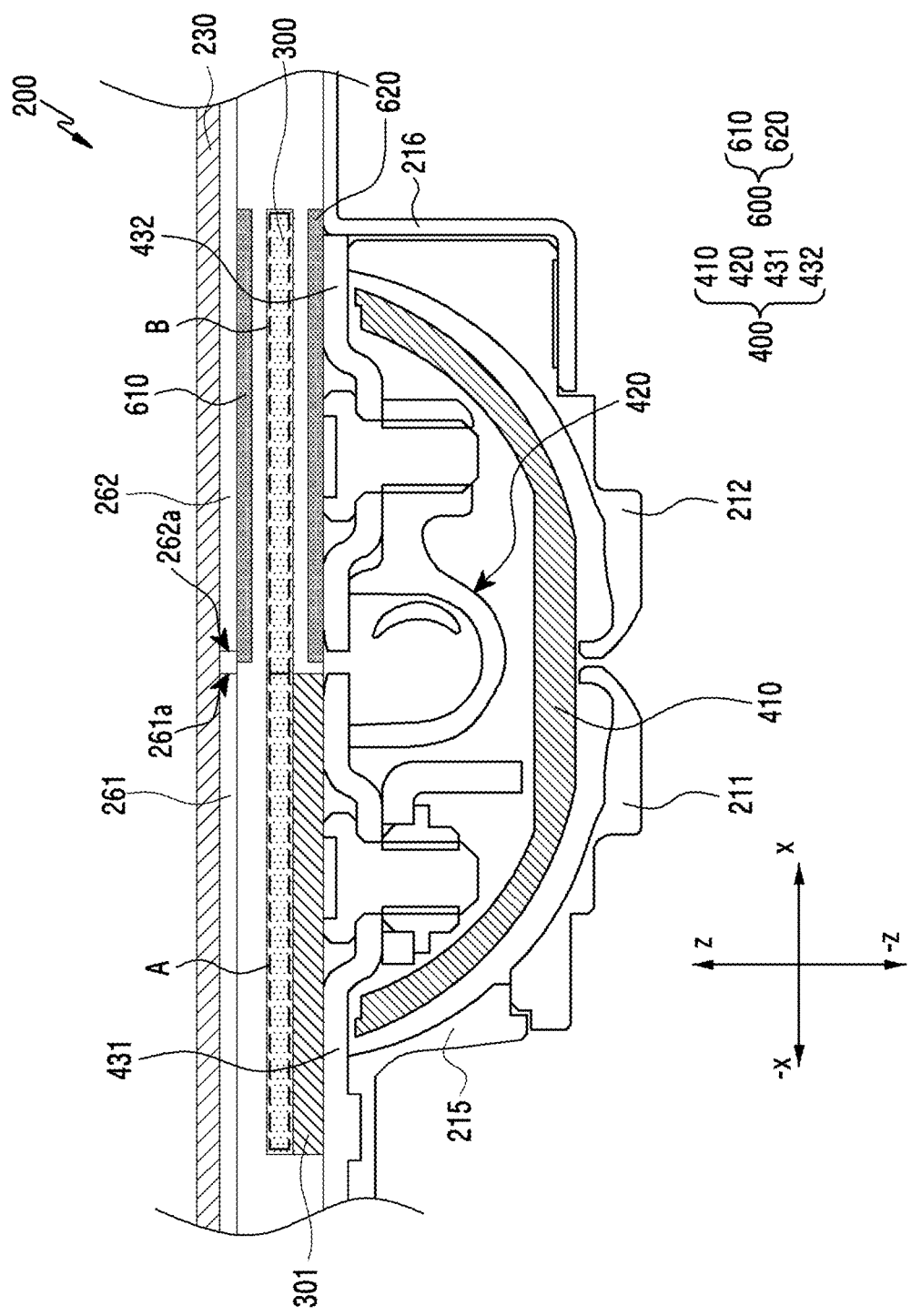
FIG. 10A is a cross-sectional view illustrating a protection layer and a friction prevention member of an electronic device according to an embodiment.
Figure 10B:
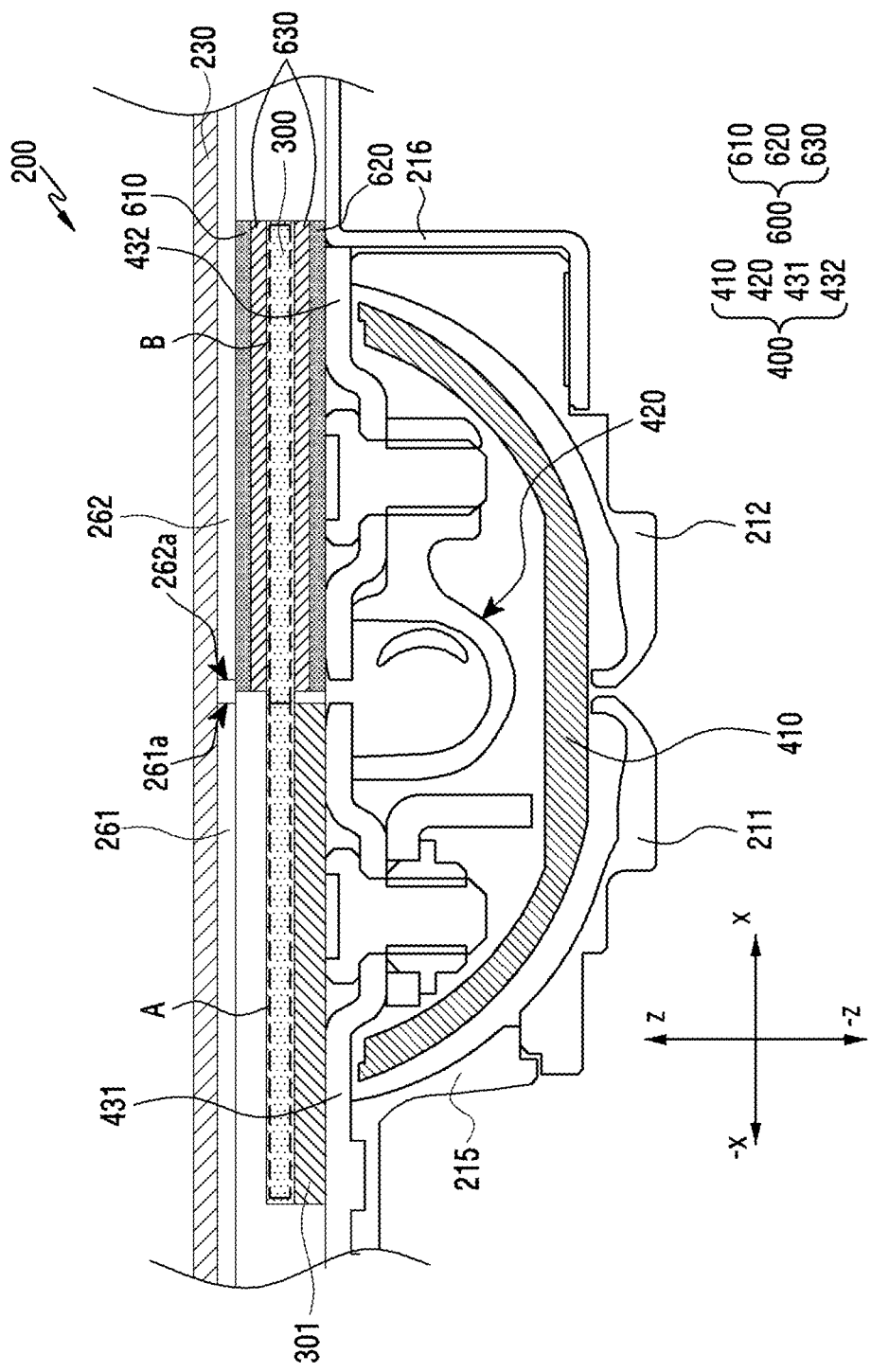
FIG. 10B is a cross-sectional view illustrating a protection layer and a friction prevention member of an electronic device according to another embodiment.

FIG. 10A is a cross-sectional view illustrating a protection layer 300 and a friction prevention member 600 of an electronic device 200 according to an embodiment, and FIG. 10B is a cross-sectional view illustrating the protection layer 300 and the friction prevention member 600 of the electronic device 200 according to another embodiment. FIGS. 10A and 10B of the disclosure illustrate cross sections of the electronic device 200 of FIG. 5, taken on line A-A'.

Referring to FIGS. 10A and 10B, the electronic device 200 according to an embodiment may include a display 230 (for example, the display 230 of FIG. 6), a first support plate 261 (for example, the first support plate 261 of FIG. 6), a second support plate 262 (for example, the second support plate 262 of FIG. 6), a first housing 211 (for example, the first housing 211 of FIG. 6), a second housing 212 (for example, the second housing 212 of FIG. 6), a connection structure 400 (for example, the connection structure 400 of FIG. 6), a protection layer 300 (for example, the protection layer 300 of FIG. 6), and a friction prevention member 600.

The electronic device 200 according to an embodiment may be the electronic device of FIGS. 6, 7 (for example, the electronic device 200 of FIGS. 6, 7) to which the friction prevention member 600 is added. That is, at least one of the components of the electronic device 200 according to an embodiment may be the same as or similar to at least one of the components of the electronic device of FIGS. 6 and/or 7, and a redundant explanation will be omitted.

Referring to FIG. 10A, the friction prevention member 600 according to an embodiment may include a first friction prevention member 610, a second friction prevention member 620. In an example, the first friction prevention member 610 may be disposed on a lower end surface (for example, a surface in the −z direction of FIG. 10A) of the second support plate 262. In an example, the second friction prevention member 620 may be disposed on an upper end surface (for example, a surface in the z direction of FIG. 10A) of a second hinge plate 432 and/or a second bracket 216.

As described above, a first area (A area) of the protection layer 300 may be fixed between the first support plate 261 and a first hinge plate 431 and/or a first bracket 215 (for example, the first bracket 215 of FIG. 4). On the other hand, a second area (B area) of the protection layer 300 may not be fixed, and as a result, the second area (B area) of the protection layer 300 may slide with reference to the second support plate 262 when the electronic device 200 pivots.

According to an embodiment, the first friction prevention member 610 may be positioned on an upper end (for example, the z direction of FIG. 10A) of the protection layer 300, and may reduce a friction generated between the protection layer 300 and the second support plate 262 when the second area (B area) of the protection layer 300 slides. Similarly, the second friction prevention member 620 may be positioned on a lower end (for example, the −z direction of FIG. 10A) of the protection layer 300, and may reduce a friction generated between the protection layer 300 and the second hinge plate 432 and/or the second bracket 216 when the second area (B area) of the protection layer 300 slides.

Referring to FIG. 10B, the friction prevention member 600 according to another embodiment may further include a third friction prevention member 630, in addition to the first friction prevention member 610, the second friction prevention member 620 described above. According to an embodiment, the third friction prevention member 630 may be attached to at least one surface of the protection layer 300, and may reduce a friction generated between the second area (B area) of the protection layer 300 and another component (for example, the second support plate 262, the second hinge plate 432, and/or the second bracket 216) when the second area (B area) of the protection layer 300 slides. In an example, the third friction prevention member 630 may be attached to at least a certain area of an upper end surface (for example, a surface in the z direction of FIG. 10B) of the protection layer 300, and may reduce a friction generated between the second area (B area) of the protection layer 300 and the second support plate 262 when the electronic device 200 pivots. In another example, the third friction prevention member 630 may be attached to at least a certain area of a lower end surface (for example, a surface in the −z direction of FIG. 10B) of the protection layer 300, and may reduce a friction generated between the second area (B area) of the protection layer 300 and the second hinge plate 432 and/or the second bracket 216 when the electronic device 200 pivots. In still another example, the third friction prevention member 630 may be attached to both the upper end surface and the lower end surface of the protection layer 300, and may reduce a friction generated between the second area (B area) of the protection layer 300 and the second support plate 262, the second hinge plate 432, and/or the second bracket 216.

The electronic device 200 according to an embodiment can allow the second area (B area) of the protection layer 300 to smoothly move (or slide) in the pivoting process of the electronic device 200, by reducing a friction between the second area (B area) of the protection layer 300 and other components (for example, the second support plate 262, the second hinge plate 432) through the first friction prevention member 610, the second friction prevention member 620, and/or the third friction prevention member 630 described above.

That is, the electronic device 200 according to an embodiment can allow the second area (B area) of the protection layer 300 to ideally move (or slide) without being stuck in some areas of the second support plate 262, the second hinge plate 432, and/or the second bracket 216, through the friction prevention member 600, in the pivoting process of the electronic device 200.

According to an embodiment, the friction prevention member 600 may be at least one of a fabric (for example, polytetrafluoroethylene fiber), an insulation tape, and a coating film, and the above-described friction prevention member 600 may be attached to at least one surface of the second support plate 262, the second hinge plate 432, and/or the protection layer 300 through an adhesive. According to another embodiment, the friction prevention member 600 may be a low friction coating layer (for example, a fluorine coating layer) that is formed by coating at least one surface of the second support plate 262, the second hinge plate 432, and/or the protection layer 300 with a material having a low friction property, but is not limited thereto. In addition, the electronic device 200 according to various embodiments may not include at least one friction prevention member of the first friction prevention member 610, the second friction prevention member 620, the third friction prevention member 630 described above.

Figure 11:
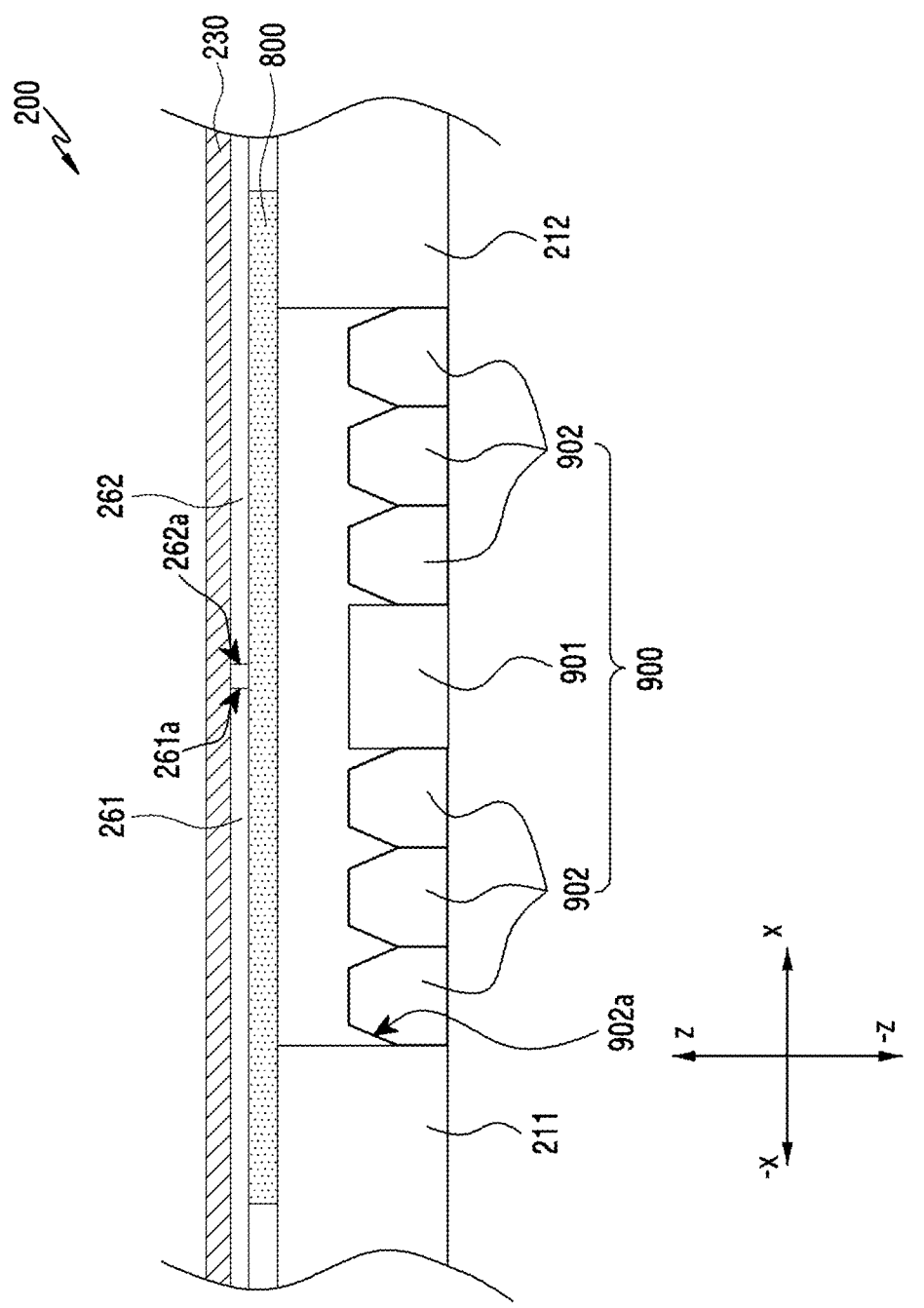
FIG. 11 is a view illustrating a cross section of an electronic device when the electronic device is in an unfolded state according to another embodiment.
Figure 12:
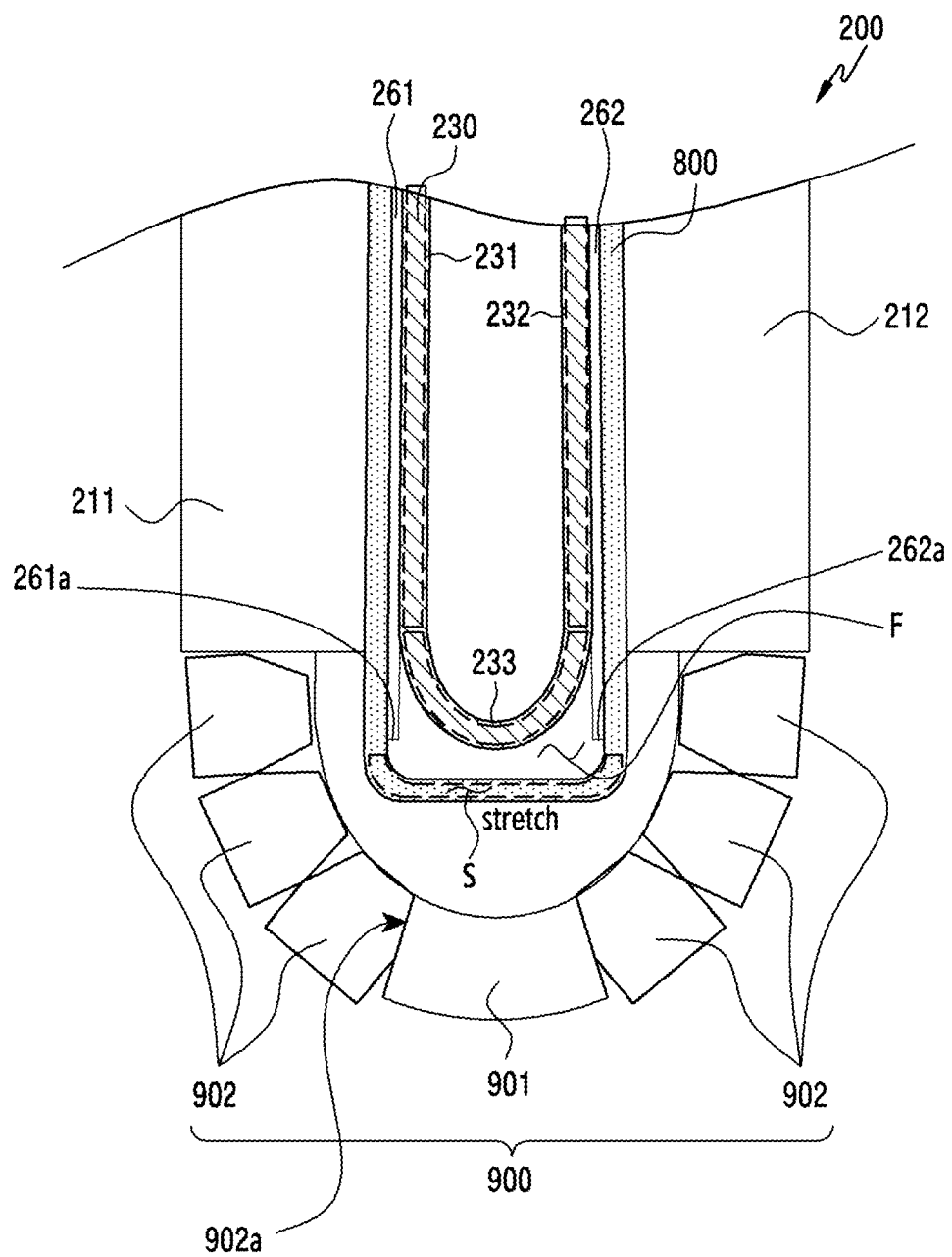
FIG. 12 is a view illustrating a cross section of an electronic device when the electronic device is in a folded state according to another embodiment.

FIG. 11 is a view illustrating a cross section of an electronic device 200 when the electronic device 200 is in an unfolded state according to another embodiment, and FIG. 12 is a view illustrating a cross section of the electronic device 200 when the electronic device 200 is in a folded state according to another embodiment. FIGS. 11 and 12 of the disclosure illustrate a cross section taken on line A-A' of FIG. 5 when the electronic device 200 of FIG. 5 is in the unfolded state and/or the folded state.

Referring to FIGS. 11 and 12, the electronic device 200 according to another embodiment may include a display 230 (for example, the display 230 of FIG. 4), a first support plate 261 (for example, the first support plate 261 of FIG. 4), a second support plate 262 (for example, the second support plate 262 of FIG. 4), a protection layer 800, a first housing 211 (for example, the first housing 211 of FIG. 4), a second housing 212 (for example, the housing 212 of FIG. 4), and a connection structure 900. At least one of the components of the electronic device 200 of FIGS. 11, 12 may be the same as or similar to at least one of the components of the electronic device of FIG. 4, and a redundant explanation will be omitted.

According to an embodiment, the connection structure 900 may be an articulated structure including at least one joint 901, 902. The articulated structure may include a first joint 901 and a plurality of second joints 902 disposed on both ends of the first joint 901, and may pivotably connect the first housing 211 and the second housing 212 through the first joint 901 and the second joints 902. In an example, the first joint 901 may be formed with a flexible material to have some areas bent, folded according to a user's operation. In another example, inclined portions 902a may be formed on both ends of each of the plurality of second joints 902, and the plurality of second joints 902 may be bent, folded while some inclined portions 902a of the plurality of second joints 902 are coming into contact with each other according to a user's operation.

In an example, when the electronic device 200 is in the unfolded state (for example, see FIG. 11), the first joint 901 and the plurality of second joints 902 may be disposed in parallel with each other. In another example, when the electronic device 200 pivots from the unfolded state to the folded state (for example, see FIG. 12), the first joint 901 may be bent in a curved shape, and as the first joint 901 is bent, the plurality of second joints 902 disposed on both ends of the first joint 901 may also be bent. As the first joint 901 and the plurality of second joints 902 are bent, the first housing 211 and the second housing 212 may be disposed to face each other.

According to another embodiment, the articulated structure may include the plurality of second joints 902 without the first joint 901. That is, according to another embodiment, when the electronic device 200 pivots from the unfolded state to the folded state, the plurality of second joints 902 may be bent, and accordingly, the first housing 211 and the second housing 212 may be disposed to face each other.

According to an embodiment, the protection layer 800 may be positioned between the first support plate 261, the second support plate 262 and the connection structure 400, or between the first support plate 261, the second support plate 262 and the first housing 211, the second housing 212. In an example, the protection layer 800 may be attached to a certain area of the first housing 211 and/or a certain area of the second housing 212 to be positioned between the first support plate 261, the second support plate 262 and the first housing 211, the second housing 212. In another example, the protection layer 800 may be attached to the first support plate 261 and/or the second support plate 262 positioned on a lower end (for example, the −z direction of FIG. 11) of the display 230.

According to an embodiment, the protection layer 800 may be formed with a flexible or stretchable material. Accordingly, when the electronic device 200 pivots from the unfolded state to the folded state or pivots from the folded state to the unfolded state, the protection layer 800 may be stretched or may contract. For example, when the electronic device 200 pivots from the unfolded state (for example, see FIG. 11) to the folded state (for example, see FIG. 12), the protection layer 800 may be stretched, and accordingly, some areas (for example, an S area of FIG. 12) of the protection layer 800 may be deformed to a shape substantially corresponding to a folding area 233 (for example, the folding area 233 of FIG. 4) the display 230.

When the electronic device 200 pivots from the unfolded state to the folded state, a first periphery 261a (for example, the first periphery 261a of FIG. 7) of the first support plate 261 and a second periphery 262a (for example, the second periphery 262a of FIG. 7) of the second support plate 262 may be detached from the display 230. Accordingly, a predetermined space F may be formed among the first periphery 261a and the folding area 233 of the display 230, the second periphery 262a.

When the electronic device 200 pivots, a gap may be formed between the first joint 441 of the articulated structure, the plurality of second joints 442, and external foreign substances may flow into the electronic device 200 through the gap formed between the first joint 441, the plurality of second joints 442. If the above-described protection layer 800 does not exist in the electronic device 200, external foreign substances drawn into the electronic device 200 may flow into the above-described space F, and may be positioned between the display 230 and the first support plate 261 and/or the second support plate 262, and accordingly, a camber defect of the display 230 may be caused by the external foreign substances.

In an example, the protection layer 800 may be disposed between the first support plate 261 and/or the second support plate 262, and the connection structure 900 disposed between the first housing 211 and the second housing 212, thereby preventing external foreign substances from flowing into the space F formed among the first periphery 261a and the folding area 233 of the display 230, the second periphery 262a. That is, the electronic device 200 according to an embodiment can prevent a defect of the display 230 (for example, a camber defect of the display 230) through the above-described protection layer 800.

In an example, some areas (for example, the S area of FIG. 12) of the protection layer 800 may be deformed to a shape substantially corresponding to some areas (for example, the folding area 233) of the display 230 when the electronic device 200 pivots from the unfolded state to the folded state. As some areas of the protection layer 800 are deformed in the pivoting process of the electronic device 200, the protection layer 800 may not hinder the folding operation of the display 230 caused when the electronic device 200 pivots.

At least a certain area of the protection layer (for example, the protection layer 300 of FIGS. 6, 7) according to another embodiment may be attached to and fixed to one surface of the first housing 211. In this case, the other area of the protection layer may not be attached to any component of the electronic device 200, and may freely slide between the second support plate 262 and the second housing 212. The other area of the protection layer described above may slide in the pivoting process of the electronic device 200, thereby not hindering the folding operation of the display 230. A process in which some areas of the protection layer described above slide in the pivoting process of the electronic device 200 is the same as or similar to the process in which the protection layer of FIG. 6, 7 (for example, the protection layer 300 of FIGS. 6, 7) slides, and a redundant explanation will be omitted.

Figure 13A:
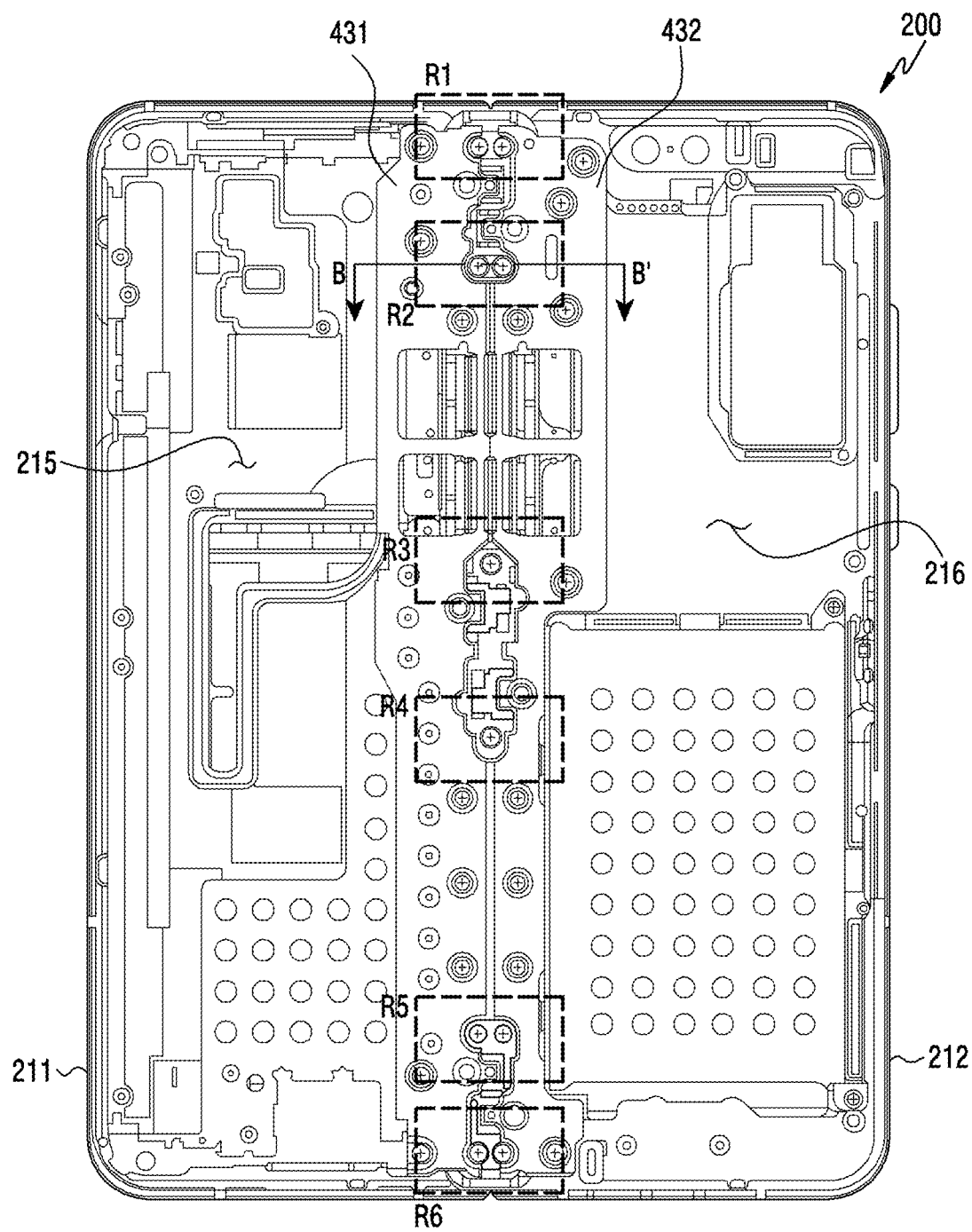
FIG. 13A is a top view illustrating some components of an electronic device according to an embodiment.
Figure 13B:
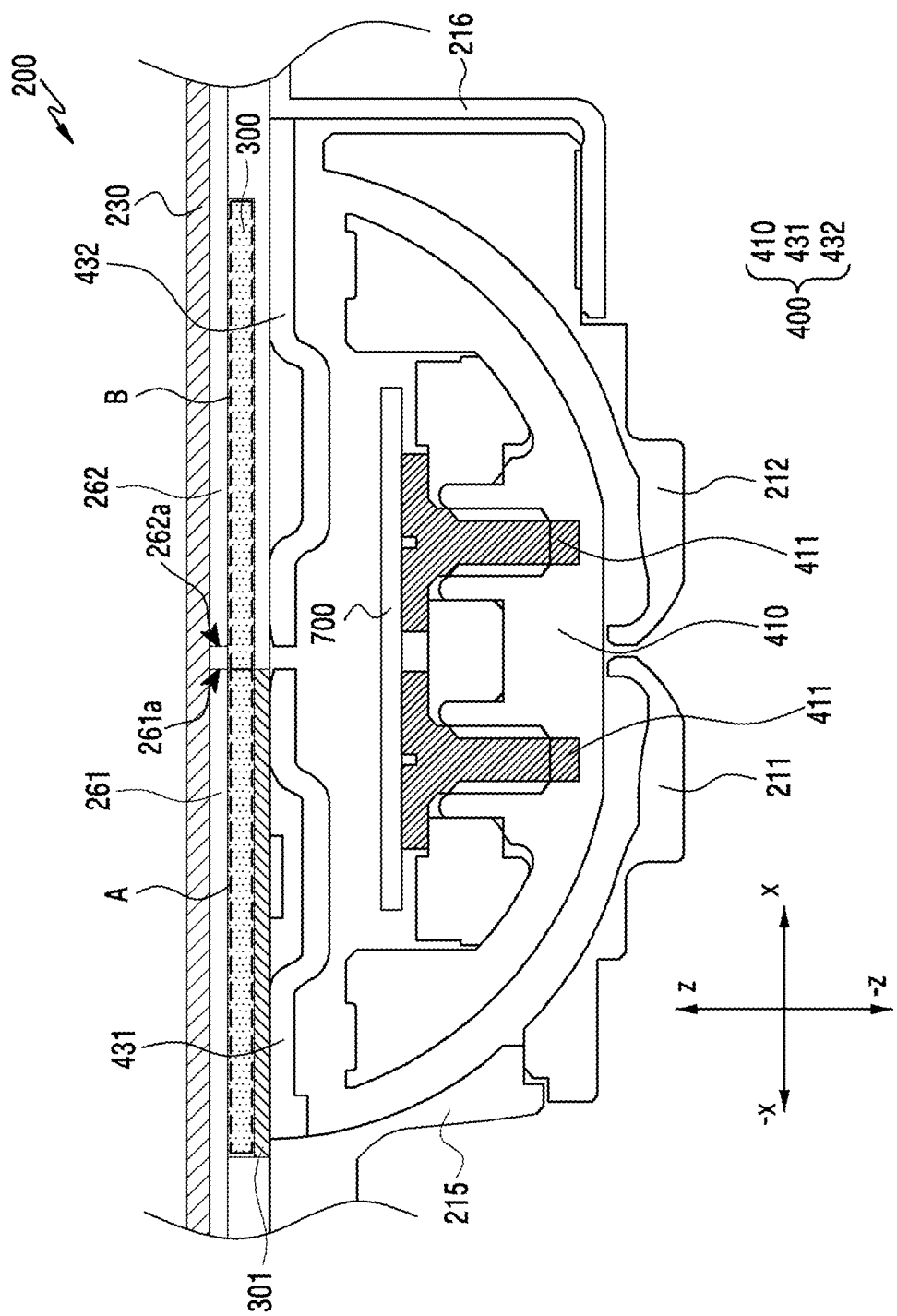
FIG. 13B illustrates a cross-sectional view of the electronic device of FIG. 13A, taken on line B-B', when the electronic device is in an unfolded state.
Figure 13C:
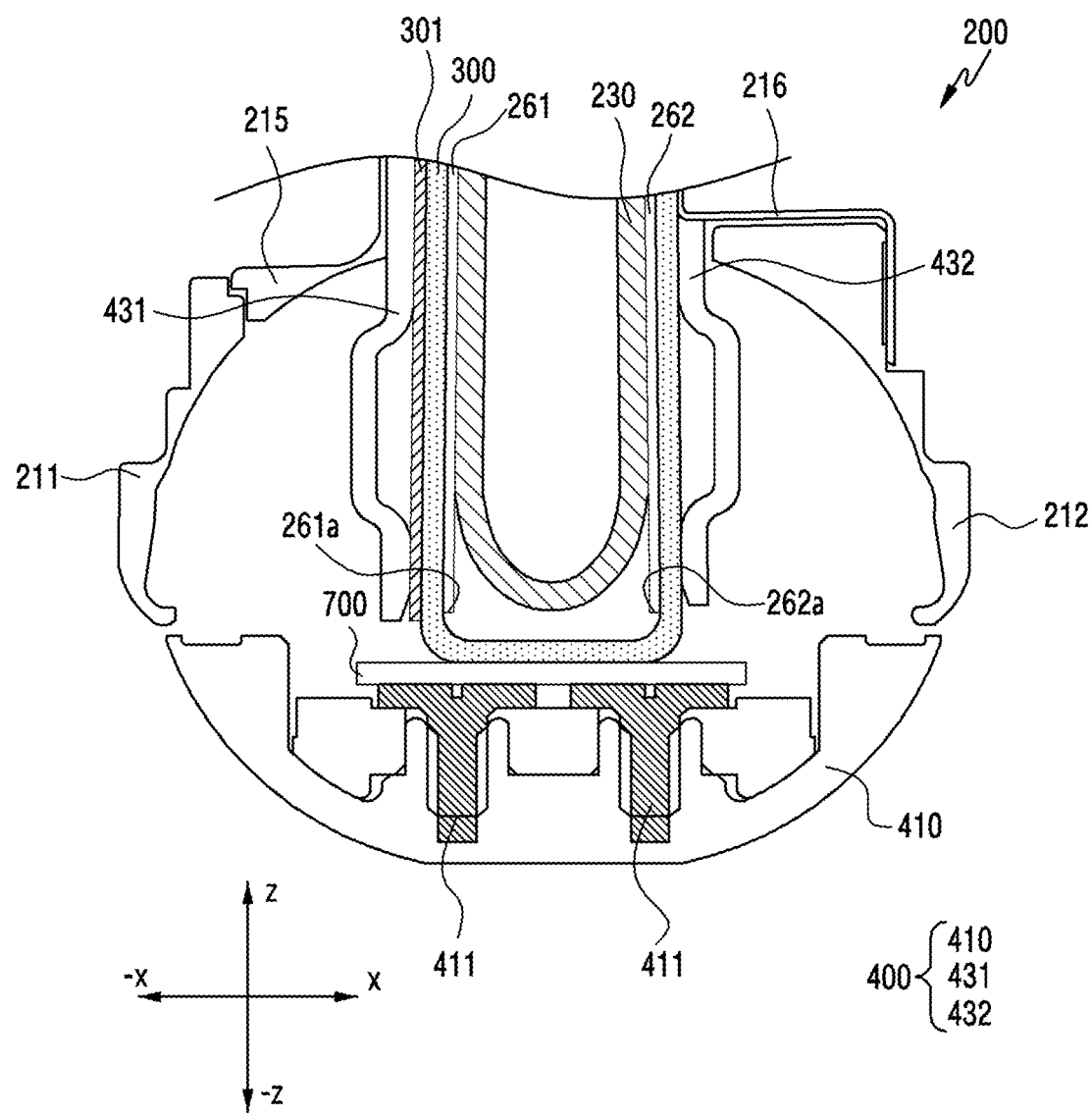
FIG. 13C is a cross-sectional view illustrating a folded state of the electronic device of FIG. 13B.

FIG. 13A is a top view illustrating some components of an electronic device 200 according to an embodiment, FIG. 13B is a cross-sectional view of the electronic device of FIG. 13A, taken on line B-B', when the electronic device 200 is in an unfolded state, and FIG. 13C is a cross-sectional view of the electronic device in a folded state.

FIG. 13A of the disclosure omits some components (for example, the display 230, the first support plate 261, the second support plate 262, the protection layer 300) of the electronic device 200.

Referring to FIGS. 13A, 13B, 13C, the electronic device 200 according to an embodiment may include a display 230 (for example, the display 230 of FIG. 4), a first support plate 261 (for example, the first support plate 261 of FIG. 4), a second support plate 262 (for example, the second support plate 262 of FIG. 4), a first housing 211 (for example, the first housing 211 of FIG. 4), a second housing 212 (for example, the second housing 212 of FIG. 4), a first bracket 215 (for example, the first bracket 215 of FIG. 4), a second bracket 216 (for example, the second bracket 216 of FIG. 4), a protection layer 300 (for example, the protection layer 300 of FIG. 4), a connection structure 400 (for example, the connection structure 400 of FIG. 4), and a support structure 700.

According to an embodiment, a first area (A area) (for example, the first area (A area) of FIGS. 6, 7) of the protection layer 300 may be fixed between the first support plate 261 and a first hinge plate 431 and/or the first bracket 215. A second area (B area) (for example, the second area (B area) of FIGS. 6, 7) of the protection layer 300 may not be fixed and may slide with reference to the second support plate 262 when the electronic device 200 pivots.

As the electronic device 200 pivots from the unfolded state (for example, see FIG. 13B) to the folded state (for example, see FIG. 13C), a first periphery 261a of the first support plate 261 and a second periphery 262a of the second support plate 262 may be spaced apart from the display 230. Accordingly, some areas (for example, the folding area 233) of the display 230 may be exposed between the first periphery 261a and the second periphery 262a, and a predetermined space F (for example, the space F of FIG. 7) may be formed by the first periphery 261a and the second periphery 262a, and some areas of the display 230.

Referring to FIGS. 13B and 13C, as the electronic device 200 pivots from the unfolded state to the folded state, the second area (B area) of the protection layer 300 slides toward a hinge housing 410, such that a sliding area (B-1 area) of the protection layer (for example, the sliding area (B-1 area) of FIG. 7) is formed. The sliding area (B-1 area) of the protection layer 300 described above may be disposed to cover some areas (for example, the folding area 233) of the display 230 exposed between the first periphery 261a and the second periphery 262a, and may prevent external foreign substances (for example, dusts) from flowing into the above-described space F.

When the protection layer 300 slides by a designated length or longer, the second area (B area) of the protection layer 300 may deviate between the second support plate 262 and a second hinge plate 432. When the second area (B area) of the protection layer 300 deviates from the second support plate 262 and the second hinge plate 432, the protection layer 300 may not cover some areas (for example, the folding area 233) of the display 230 exposed between the first periphery 261a and the second periphery 262a, and may not prevent external foreign substances from flowing into the above-described space F. In addition, when the protection layer 300 slides by the designated length or longer, the protection layer 300 may come into contact with some components (for example, the hinge housing 410 or a hinge module) of the connection structure 400. In this case, the protection layer 300 may be damaged by a portion protruding from the connection structure 400. Accordingly, the electronic device 200 according to an embodiment may prevent the second area B of the protection layer 300 from sliding by the designated distance or longer through the support structure 700 when the electronic device 200 pivots from the unfolded state to the folded state. Accordingly, the electronic device 200 described above can prevent the protection layer 300 from deviating between the second support plate 262 and the second hinge plate 432, or can prevent the protection layer 300 from being damaged by a component (for example, the hinge module) of the connection structure 400 in a certain area of the connection structure 400 where the support structure 700 is not disposed.

According to an embodiment, the connection structure 400 may be a hinge structure that includes a hinge housing 410 (for example, the hinge housing 410 of FIG. 4), at least one hinge module (for example, the at least one hinge module 420 of FIG. 4), the first hinge plate 431, and the second hinge plate 432. At least one hinge module may be disposed within the hinge housing 410, and the above-described hinge module may be fixed to the hinge housing 410 through a fastening portion 411 (for example, a screw).

The support structure 700 according to an embodiment may be positioned on an area of an inner space of the hinge housing 410 where the hinge module is not mounted, thereby preventing the second area (B area) of the protection layer 300 from sliding by the designated distance or longer. In an example, the support structure 700 may be disposed in an area (for example, R1, R2, R3, R4, R5, R6 of FIG. 13A) where the hinge module is fixed to the hinge housing 410 through the fastening portion 411, or may be disposed in an empty space between the hinge modules 420.

According to an embodiment, the support structure 700 may support at least a certain area of the sliding area (B-1 area) of the protection layer 300 when the electronic device 200 pivots from the unfolded state to the folded state. The support structure 700 can prevent the second area (B area)

of the protection layer 300 from sliding by the designated distance or longer by supporting the sliding area (B-1 area) of the protection layer 300. The support structure 700 according to an embodiment can prevent the second area (B area) of the protection layer 300 from deviating between the second support plate 262 and the second hinge plate 432. In addition, the above-described support structure 700 can prevent the protection layer 300 from being damaged by a component of the connection structure 400 in some areas of the connection structure 400 where the support structure 700 is not disposed, by preventing the protection layer 300 from sliding by the designated distance or longer.

The support structure 700 may have at least one surface formed in a flat shape to prevent the protection layer 300 from being damaged in the process of supporting some areas (for example, the sliding area B-1) of the protection layer 300. In an example, the support structure 700 may be at least one of a protection film, a thin film metal sheet, etc. disposed on an upper end of the fastening portion 411. In another example, the support structure 700 may be a support rib that has an area contacting the sliding area (B-1 area) of the protection layer 300 and formed in a flat shape. However, the support structure 700 is not limited to the above-described embodiment and any structure that can prevent the protection layer 300 from sliding by the designated distance or longer when the electronic device 200 pivots may be used.

Figure 14:
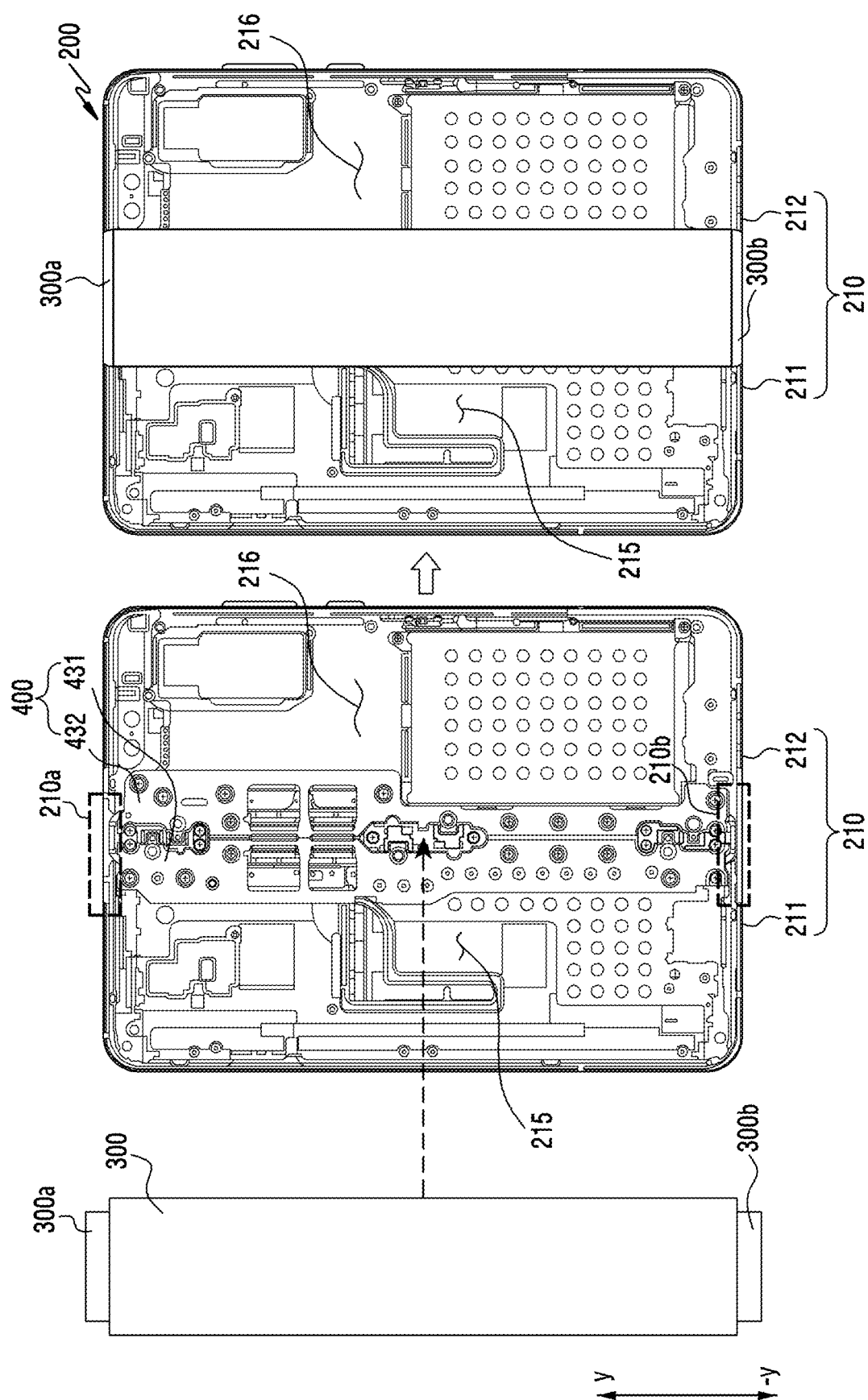
FIG. 14 is a view illustrating a protection layer of an electronic device and a foldable housing to which the protection layer is attached according to an embodiment.
Figure 15:
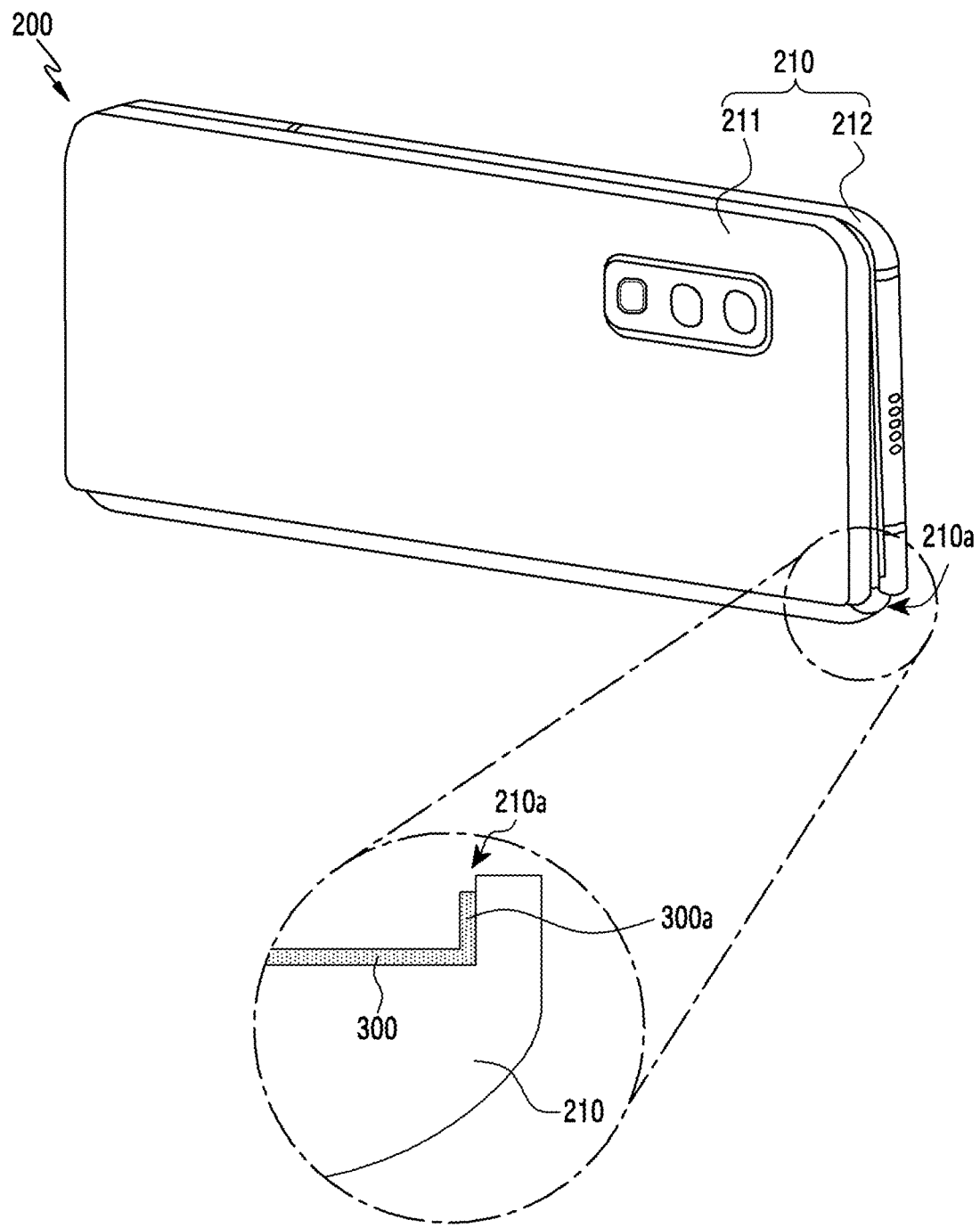
FIG. 15 is a view illustrating a cross section of some areas of an electronic device when the electronic device is in a folded state according to an embodiment.

FIG. 14 is a view illustrating a protection layer 300 of an electronic device 200 and a foldable housing 210 to which the protection layer is attached according to an embodiment, and FIG. 15 is a view illustrating a cross section of some areas of the electronic device when the electronic device 200 is in a folded state according to an embodiment. FIG. 14 of the disclosure omits some components of the electronic device 200 (for example, the display 230, the first support plate 261, the second support plate 262).

Referring to FIGS. 14 and 15, the electronic device 200 according to an embodiment may include a foldable housing 210 (for example, the foldable housing 210 of FIG. 4) including a first housing 211 (for example, the first housing 211 of FIG. 4) and a second housing 212 (for example, the second housing 212 of FIG. 4), a hinge housing (for example, the hinge housing 410 of FIG. 4), a first bracket 215 (for example, the first bracket 215 of FIG. 4), a second bracket 216 (for example, the second bracket 216 of FIG. 4), a connection structure 400 (for example, the connection structure 400 of FIG. 4) including a first hinge plate 431 (for example, the first hinge plate 431 of FIG. 4), a second hinge plate 432 (for example, the second hinge plate 432 of FIG. 4), and a protection layer 300. At least one of the components of the electronic device 200 of FIGS. 14, 15 may be the same as or similar to at least one of the components of the electronic device of FIG. 4, and a redundant explanation will be omitted.

According to an embodiment, the protection layer 300 may include a first portion 300a protruding from an upper end area (for example, an area in the y direction of FIG. 14) of the protection layer 300 in a longitudinal direction (for example, the y direction of FIG. 14), and a second portion 300b protruding from a lower end area (for example, an area in the −y direction of FIG. 14) of the protection layer 300 in a longitudinal direction (for example, the −y direction of FIG. 14). According to an embodiment, the first portion 300a and the second portion 300b of the protection layer 300 may be formed with the same material (for example, a PET material) as the other area of the protection layer 300. According to another embodiment, the first portion 300a and the second portion 300b of the protection layer 300 may be formed with a material different from that of the other area of the protection layer 300. That is, the first portion 300a and the second portion 300b may be separate configurations attached to the upper end and the lower end of the protection layer 300, respectively. In an example, the first portion 300a and the second portion 300b may be formed with a flexible material. For example, the first portion 300a and the second portion 300b may be one of a sponge, a thin film, but is not limited thereto.

According to an embodiment, the protection layer 300 may be attached to a certain area (for example, the first hinge plate 431) of the connection structure 400, or may be attached to a certain area of the first bracket 215 disposed in the foldable housing 210. The first portion 300a of the protection layer 300 may be disposed adjacent to a certain area of an upper end periphery 210a (for example, a periphery in the y direction of FIG. 13B or 13C) of the foldable housing 210. Similarly, the second portion 300b of the protection layer 300 may be disposed adjacent to a certain area of a lower end periphery 210b (for example, a periphery in the −y direction of FIG. 13B or 13C) of the foldable housing 210. In an example (for example, see FIG. 14), the first portion 300a and the second portion 300b of the protection layer 300 may be substantially perpendicular to the other area of the protection layer 300, and may be disposed adjacent to a certain area of the upper end periphery 210a and the lower end periphery 210b of the foldable housing 210. The first portion 300a and the second portion 300b of the protection layer 300 described above may be disposed adjacent to a certain area of the upper end periphery 210a and the lower end periphery 210b of the foldable housing 210, thereby reducing a gap between the foldable housing 210 and the protection layer 300.

According to an embodiment, the electronic device 200 can prevent foreign substances (for example, dusts), drawn into the electronic device 200, from flowing into a display (for example, the display 230 of FIG. 4), by reducing a gap between the upper end periphery 210a and/or the lower end periphery 210b of the foldable housing 210, and the protection layer 300 through the first portion 300a and the second portion 300b of the protection layer 300. That is, the electronic device 200 according to an embodiment can not only prevent external foreign substances from flowing toward the display through the protection layer 300 in the pivoting process of the electronic device 200, but also prevent foreign substances, drawn into the electronic device 200, from flowing toward the display.

At least one slit may be formed on at least a certain area of the first portion 300a and the second portion 300b of the protection layer 300. In an example, the first portion 300a and the second portion 300b of the protection layer 300 may be disposed adjacent to at least a certain area (for example, an upper end area (for example, an area in the y direction of FIG. 14) and/or a lower end area (for example, an area in the −y direction of FIG. 14)) of the first housing 211 and/or the second housing 212 of the foldable housing 210. Accordingly, the first portion 300a and the second portion 300b of the protection layer 300 may be crumpled, or folded when the electronic device 200 pivots from the folded state to the unfolded state or pivots from the unfolded state to the folded state.

The electronic device 200 according to an embodiment may have at least one slit formed on at least a certain area of the first portion 300a and the second portion 300b, such that the first portion 300a and the second portion 300b can be crumpled without being spaced apart from the upper end periphery 210a and/or the lower end periphery 210b of the foldable housing 210 in the pivoting process of the electronic device 200 (a process of pivoting from the unfolded state to the folded state). In an embodiment, the above-described at least one slit of the first portion 300a and the second portion 300b may be formed by cutting the first portion 300a and the second portion 200b, but is not limited thereto.

According to an embodiment of the disclosure, an electronic device (for example, the electronic device 200 of FIG. 2) may include: a foldable housing (for example, the foldable housing 210 of FIG. 4) including a first housing (for example, the first housing 211 of FIG. 4), a second housing (for example, the second housing 212 of FIG. 4), and a connection structure (for example, the connection structure 400 of FIG. 4) configured to connect the first housing and the second housing to enable the second housing to pivot about the first housing; a flexible display (for example, the display 230 of FIG. 4) which is disposed from one area of the first housing to at least one area of the second housing across the connection structure, and is foldable according to the pivoting; a first plate (for example, the first support plate 261 of FIGS. 4, 6) which has at least a portion disposed on a lower end of a first area of the flexible display corresponding to the first housing, and has a first periphery (for example, 261a of FIG. 6) extended along a center axis of the pivoting; a second plate (for example, the second support plate 262 of FIGS. 4, 6) which has at least a portion disposed on a lower end of a second area of the flexible display corresponding to the second housing, and has a second periphery (for example, 262a of FIG. 6) extended along the center axis of the pivoting and adjacent to the first periphery of the first plate; and a protection layer (for example, the protection layer 300 of FIGS. 4, 6) which is in contact with the first plate and the second plate on at least some areas, and is disposed between the first plate and the second plate, and the connection structure, and, when the electronic device is in an unfolded state, the first periphery of the first plate and the second periphery of the second plate may be in contact with the flexible display, and, when the electronic device pivots from the unfolded state to a folded state, the first periphery of the first plate and the second periphery of the second plate may be spaced apart from the flexible display, and the protection layer may be disposed to cover an area of the flexible display that is exposed between the first periphery of the first plate and the second periphery of the second plate.

According to an embodiment, the connection structure may be a hinge assembly.

According to an embodiment, the hinge assembly may include: a hinge housing (for example, the hinge housing 410 of FIG. 4); and at least one hinge module (for example, the hinge module 420 of FIG. 4) positioned inside the hinge housing, and configured to pivotably connect the first housing and the second housing.

According to an embodiment, one area (for example, the A area of FIG. 6) of the protection layer may be fixed between the first plate and the hinge assembly, and the other area (for example, the B area of FIG. 6) of the protection layer may slidably move with respect to the second plate according to the pivoting.

According to an embodiment, the hinge assembly may further include: a first hinge plate (for example, the first hinge plate 431 of FIGS. 4, 6) positioned on a lower end of the protection layer to support at least some areas of the first area of the flexible display; and a second hinge plate (for example, the second hinge plate 432 of FIGS. 4, 6) positioned on a lower end of the protection layer to support at least some areas of the second area of the flexible display.

According to an embodiment, the one area of the protection layer MAY BE attached to at least one area of an inner surface of the first housing or at least one area of the first plate.

According to an embodiment, the electronic device may further include a bonding plate (for example, the bonding plate 500 of FIG. 8) disposed between at least one area of the protection layer and the first hinge plate, and having one surface formed in a flat shape.

According to an embodiment, the one area of the protection layer may be attached to at least one area of the bonding plate.

According to an embodiment, the electronic device may further include a reinforcement plate (for example, the reinforcement plate 310 of FIG. 9) attached to at least one area of the other area of the protection layer and having stiffness.

According to an embodiment, the electronic device may further include a first friction prevention member (for example, the first friction prevention member 610 of FIG. 10A) attached to at least one surface of the second plate facing the protection layer to prevent a friction generated between the protection layer and the second plate.

According to an embodiment, the electronic device may further include a second friction prevention member (for example, the second friction prevention member 620 of FIG. 10A) attached to at least one surface of the second hinge plate facing the protection layer to prevent a friction generated between the protection layer and the second hinge plate.

According to an embodiment, the electronic device may further include a third friction prevention member (for example, the third friction prevention member 630 of FIG. 10B) attached to at least one surface of the other area of the protection layer to prevent a friction generated between the protection layer and the second plate or the second hinge plate.

According to an embodiment, the protection layer (for example, the protection layer 800 of FIG. 12) may be formed with a stretchable material, and the protection layer may be stretched when the electronic device pivots from the unfolded state to the folded state.

According to an embodiment, the connection structure (for example, the connection structure 900 of FIGS. 11, 12) may be an articulated structure that pivotably connects the first housing and the second housing.

According to an embodiment, the first plate and the second plate may be formed with a material having designated stiffness.

According to an embodiment, the hinge assembly may further include a support structure (for example, the support structure 700 of FIGS. 13B, 13C) positioned within the hinge housing to support at least one area of the protection layer when the electronic device pivots from the unfolded state to the folded state.

According to an embodiment, the foldable housing may include an upper end periphery (for example, the upper end periphery 210a of FIG. 14) and a lower end periphery (for example, the lower end periphery 210b of FIG. 14), and the protection layer may be extended in a longitudinal direction (for example, the first portion 300a, the second portion 300b of FIG. 14) and may be disposed adjacent to at least one area of the upper end periphery and the lower end periphery of the foldable housing.

According to an embodiment, an electronic device (for example, the electronic device 200 of FIG. 4) may include: a foldable housing (for example, the foldable housing 210 of FIG. 4) including a first housing (for example, the first housing 211 of FIG. 4), a second housing (for example, the second housing 212 of FIG. 4), and a connection structure (for example the connection structure 400 of FIG. 4) configured to connect the first housing and the second housing to enable the second housing to pivot about the first housing; a flexible display (for example, the display 230 of FIG. 4) which is disposed from one area of the first housing to at least one area of the second housing across the connection structure, and is foldable according to the pivoting; a first plate (for example, the first support plate 261 of FIGS. 4, 6) which has at least a portion disposed under a first area of the flexible display corresponding to the first housing, and has a first periphery (for example, 261a of FIG. 6) extended along a center axis of the pivoting; a second plate (for example, the second support plate 262 of FIGS. 4, 6) which has at least a portion disposed under a second area of the flexible display corresponding to the second housing, and has a second periphery (for example, 262a of FIG. 6) extended along the center axis of the pivoting and adjacent to the first periphery of the first plate; and a protection layer (for example, the protection layer 300 of FIGS. 4, 6) which is in contact with the first plate and the second plate on at least some areas, and is disposed between the first plate and the second plate, and the connection structure.

According to an embodiment, the protection layer may be disposed to cover an area of the flexible display that is exposed between the first periphery of the first plate and the second periphery of the second plate when the electronic device pivots from an unfolded state to a folded state.

According to an embodiment, one area (for example, the A area of FIG. 6) of the protection layer may be fixed between the first plate and the connection structure, and the other area (for example, the B area of FIG. 6) of the protection layer may slide on the second plate according to the pivoting.

According to an embodiment of the disclosure, the electronic device can prevent external foreign substances (for example, dusts, etc.) from flowing between the display and the display support plate in the processing of pivoting from the unfolded state to the folded state or pivoting from the folded state to the unfolded state. In addition, the electronic device according to an embodiment of the disclosure can prevent a defect of the display (for example, a camber defect of the display) from being caused by external foreign substances.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

Although the present disclosure has been described with various embodiments, various changes and modifications may be suggested to one skilled in the art. It is intended that the present disclosure encompass such changes and modifications as fall within the scope of the appended claims.

What is claimed is:

1. A portable communication device comprising:
   a housing including a first housing portion and a second housing portion;
   a flexible display including a first display area accommodated in the first housing portion, a second display area accommodated in the second housing portion, and a folding area located between the first display area and the second display area;
   a hinge assembly coupled with the first housing portion and the second housing portion, the hinge assembly including:
   a first hinge plate disposed between the first housing portion and the flexible display and configured to support part of the first display area;
   a second hinge plate disposed between the second housing portion and the flexible display and configured to support part of the second display area;
   a hinge housing disposed between the first housing portion and the second housing portion such that the hinge housing is substantially exposed to an outside of the portable communication device when the housing is folded and substantially hidden by the first housing portion and the second housing portion when the housing is unfolded; and
   a hinge module to which each of the first housing portion and the second housing portion is pivotably connected, the hinge module configured to be surrounded by the first hinge plate, the second hinge plate and the hinge housing when the housing is unfolded;
   a protection layer extended over the first hinge plate, the second hinge plate and the hinge module, the protection layer including a first area fixed at the first hinge plate and a second area slidable with respect to the second hinge plate according to the housing being folded; and
   a film member disposed between the second hinge plate and the second area of the protection layer.

2. The portable communication device of claim 1, wherein the film member is attached to the second hinge plate.

3. The portable communication device of claim 1, wherein the film member includes an insulation member.

4. The portable communication device of claim 1, further comprising:
   a bonding plate disposed between the first area of the protection layer and the first hinge plate such that the first area of the protection layer is fixed to the first hinge plate via the bonding plate.

5. The portable communication device of claim 1, wherein the film member is a friction prevention member that reduce a friction between the second hinge plate and the second area of the protection layer.

6. The portable communication device of claim 1, wherein the film member includes a friction prevention member to reduce a friction between the second hinge plate and the second area of the protection layer.

7. The portable communication device of claim 1, wherein the protection layer has a first width larger than a second width of the hinge housing.

8. The portable communication device of claim 1, wherein the folding area of the flexible display is bent when a space between the first hinge plate and the second hinge plate increases according to the housing being folded.

9. The portable communication device of claim 8, wherein a part of the protection layer deforms into a shape corresponding to the folding area of the flexible display when the space between the first hinge plate and the second hinge plate increases according to the housing being folded.

10. The portable communication device of claim 1, wherein the protection layer stretches when a space between the first hinge plate and the second hinge plate increases according to the housing being folded.

11. The portable communication device of claim 1, wherein the protection layer contracts when a space between the first hinge plate and the second hinge plate decreases according to the housing being unfolded.

12. The portable communication device of claim 1, wherein the first display area and the second display area are disposed to substantially face each other when the portable communication device is fully folded.

13. The portable communication device of claim 1, wherein the first hinge plate and the second hinge plate are disposed to substantially face each other when the portable communication device is fully folded.

14. The portable communication device of claim 1, wherein the first display area and the second display area are disposed to face in a substantially same direction when the portable communication device is unfolded.

15. The portable communication device of claim 1, wherein the first hinge plate and the second hinge plate are disposed to face in a substantially same direction when the portable communication device is unfolded.

16. The portable communication device of claim 1, wherein the second area of the protection layer slides in a direction toward the hinge housing when a space between the first hinge plate and the second hinge plate increases according to the housing being folded.

17. A portable communication device comprising:
a housing including a first housing portion and a second housing portion and foldable with respect to a folding axis;
a flexible display including a first display area accommodated in the first housing portion, a second display area accommodated in the second housing portion, and a folding area located between the first display area and the second display area;
a hinge assembly coupled with the first housing portion and the second housing portion, the hinge assembly including:
  a first hinge plate disposed between the first housing portion and the flexible display, and configured to support part of the first display area;
  a second hinge plate disposed between the second housing portion and the flexible display, and configured to support part of the second display area;
  a hinge housing disposed between the first housing portion and the second housing portion such that the hinge housing is substantially exposed to an outside of the portable communication device when the housing is folded and substantially hidden by the first housing portion and the second housing portion when the housing is unfolded; and
  a hinge module to which each of the first housing portion and the second housing portion is pivotably connected, the hinge module configured to be surrounded by the first hinge plate, the second hinge plate and the hinge housing when the housing is unfolded;
a protection layer extended over the first hinge plate, the second hinge plate and the hinge module, the protection layer including a first area fixed at the first hinge plate and a second area slidable with respect to the second hinge plate according to the housing being folded; and
an insulation member disposed on an upper surface of the second hinge plate.

18. The portable communication device of claim 17, wherein the insulation member is composed of a material having a low friction property such that a friction between the second hinge plate and the second area of the protection layer is reduced based at least in part on the insulation member.

19. The portable communication device of claim 17, further comprising:
another insulation member disposed on an upper surface of the protection layer.

20. The portable communication device of claim 18, further comprising:
a third insulation member disposed on a lower surface of the protection layer.

21. A portable communication device comprising:
a housing including a first housing portion and a second housing portion;
a flexible display including a first display area accommodated in the first housing portion, a second display area accommodated in the second housing portion, and a folding area located between the first display area and the second display area;
a hinge assembly coupled with the first housing portion and the second housing portion, the hinge assembly including:
  a first hinge plate disposed between the first housing portion and the flexible display and configured to support part of the first display area;
  a second hinge plate disposed between the second housing portion and the flexible display and configured to support part of the second display area;
  a hinge housing disposed between the first housing portion and the second housing portion such that the hinge housing is substantially exposed to an outside of the portable communication device when the housing is folded and substantially hidden by the first housing portion and the second housing portion when the housing is unfolded; and
  a hinge module to which each of the first housing portion and the second housing portion is pivotably connected, the hinge module configured to be surrounded by the first hinge plate, the second hinge plate and the hinge housing when the housing is unfolded;
a protection layer extended over the first hinge plate, the second hinge plate and the hinge module, the protection layer including a first area fixed at the first hinge plate and a second area slidable with respect to the second hinge plate according to the housing being folded; and
an adhesive member disposed between the first area of the protection layer and the first hinge plate such that the first area of the protection layer is attached to the first hinge plate via the adhesive member.

* * * * *